United States Patent
Grande, III et al.

(10) Patent No.: US 10,450,849 B2
(45) Date of Patent: Oct. 22, 2019

(54) SYSTEM AND METHOD FOR SYSTEM AND METHOD FOR A TURBOMACHINE MULTIPHASE HYRDROCARBON PUMP HAVING AN AUGER COUPLING

(71) Applicants: Salvatore F. Grande, III, Bayfield, CO (US); Sami Suheil, Bellaire, TX (US)

(72) Inventors: Salvatore F. Grande, III, Bayfield, CO (US); Sami Suheil, Bellaire, TX (US)

(73) Assignee: BCRT TECHNOLOGY, Houston, TX (US)

( * ) Notice: Subject to any disclaimer, the term of this patent is extended or adjusted under 35 U.S.C. 154(b) by 0 days.

(21) Appl. No.: 15/787,281

(22) Filed: Oct. 18, 2017

(65) Prior Publication Data

US 2018/0258749 A1    Sep. 13, 2018

Related U.S. Application Data

(63) Continuation of application No. 15/456,527, filed on Mar. 12, 2017.

(51) Int. Cl.
| | | |
|---|---|---|
| *E21B 43/38* | (2006.01) | |
| *F01D 1/34* | (2006.01) | |
| *F01D 15/02* | (2006.01) | |
| *F01D 21/14* | (2006.01) | |
| *B01D 45/14* | (2006.01) | |
| *E21B 43/12* | (2006.01) | |

(Continued)

(52) U.S. Cl.
CPC .......... *E21B 43/38* (2013.01); *B01D 21/2461* (2013.01); *B01D 21/262* (2013.01); *B01D 21/265* (2013.01); *B01D 45/14* (2013.01); *E21B 43/121* (2013.01); *E21B 43/128* (2013.01); *F01D 1/34* (2013.01); *F01D 13/00* (2013.01); *F01D 15/02* (2013.01); *F01D 21/14* (2013.01); *B01D 2221/04* (2013.01); *F05D 2210/13* (2013.01); *F05D 2220/323* (2013.01); *F05D 2250/25* (2013.01)

(58) Field of Classification Search
CPC .......... F01D 13/00; F01D 15/02; F01D 21/14; F01D 1/34; B01D 21/14; B01D 21/24; B01D 21/2461; B01D 21/265; B01D 45/14; E21B 43/12; E21B 43/21; E21B 43/38
USPC ....... 415/90, 206, 224, 226, 227; 416/198 R, 416/201 R
See application file for complete search history.

(56) References Cited

U.S. PATENT DOCUMENTS

| | | | | |
|---|---|---|---|---|
| 3,234,716 A | * | 2/1966 | Sevin ...................... | B01D 45/14 209/710 |
| 4,025,225 A | * | 5/1977 | Durant ..................... | F01D 1/36 415/199.1 |

(Continued)

*Primary Examiner* — John Kwon
*Assistant Examiner* — Johnny H Hoang
(74) *Attorney, Agent, or Firm* — G. Michael Roebuck, PC

(57) ABSTRACT

A bladeless conical radial rotary machine method and system are disclosed. Turbo-machinery and methods are disclosed for a bladeless conical radial rotary machine wherein fluid is directed axially within the pump body to produce an axial output. The rotor comprises a plurality of spaced apart conical elements. The fluid is smoothly directed to any number of subsequent boundary layer pumping stages which are axially positioned with respect to each other. The fluid is smoothly directed to any number of subsequent boundary layer pumping stages which are axially positioned with respect to each other. A coupling between pumping stages is disclosed.

2 Claims, 15 Drawing Sheets

(51) Int. Cl.
*B01D 21/26* (2006.01)
*B01D 21/24* (2006.01)
*F01D 13/00* (2006.01)

(56) References Cited

U.S. PATENT DOCUMENTS

| | | | | |
|---|---|---|---|---|
| 4,586,871 A * | 5/1986 | Glass | ................ | F01D 1/36 |
| | | | | 415/202 |
| 6,227,796 B1 * | 5/2001 | Markovitch | ............ | F04D 5/001 |
| | | | | 415/199.1 |
| 6,368,078 B1 * | 4/2002 | Palumbo | ................... | F01D 1/36 |
| | | | | 415/202 |
| 6,752,597 B2 * | 6/2004 | Pacello | ............... | F04D 29/2255 |
| | | | | 416/186 R |
| 7,192,244 B2 * | 3/2007 | Grande, III | ............... | F01D 1/36 |
| | | | | 415/206 |
| 8,523,539 B2 * | 9/2013 | Gill | ........................ | F04D 5/001 |
| | | | | 384/280 |

* cited by examiner

SYSTEM AND METHOD FOR SYSTEM AND METHOD FOR A TURBOMACHINE MULTIPHASE HYRDROCARBON PUMP HAVING AN AUGER COUPLING

CROSS-REFERENCE TO RELATED APPLICATIONS

This patent application is related to U.S. Pat. No. 7,192,244 entitled Bladeless Conical Radial Rotary Machine and Method by Salvatore Grande, III et al., issued Mar. 20, 2007 and also U.S. Patent Application Ser. No. 62/307,097 filed on Mar. 11, 2016 entitled System and Method For A Turbomachine Multiphase Hyrdrocarbon Pump, Motor And Fluid Separator by Salvatore Grande, III et al., also U.S. Patent Application Ser. No. 62/369,316 filed on Aug. 1, 2016 entitled A System and Method for an Auger Coupling by Salvatore Grande, III et al., all of which are hereby incorporated by reference in their entirety.

BACKGROUND OF THE INVENTION

Boundary layer or bladeless rotary machines, pumps, and other related turbo-machinery have been known and patented as early as May 6, 1913 when Nikola Tesla described a boundary layer pump in U.S. Pat. No. 1,061,142. The boundary layer pump taught in that patent utilizes rotating flat disks which have no blades, vanes, or propellers, so that such pumps are now also referred to as bladeless pumps. In related U.S. Pat. No. 1,061,206, Tesla disclosed a fluid driven boundary layer or bladeless rotary machine which may be utilized as a prime mover, such as a hydro-electric power generator for transforming kinetic energy in flowing fluids into electrical energy. Another example of related boundary layer or bladeless turbo-machinery invented by Tesla, and described in U.S. Pat. No. 1,329,559, shows a boundary layer or bladeless rotary machine implemented as an internal combustion engine wherein one or more combustion chambers may be substantially continuously fed with fuel and air to thereby produce expanding hot gases which drive the rotary machine.

FIELD OF THE INVENTION

The present invention relates to an auger coupling between pumps, pump sections and boundary layer pumps and in particular to an auger coupling used between a pump and a turbomachine used as a motor, pump and filter in the production of hydrocarbons.

SUMMARY OF THE INVENTION

A system and method are disclosed for an auger coupling between pumps. The pumps can be auger pumps, reciprocating pumps and turbomachine pumps that pumps and filters hydrocarbons. The turbomachine pump acts as a filter that separates fluid from solids. A system and method are disclosed that places the auger coupling between pumps that pump and compresses hydrocarbons. A system and method are disclosed that places the auger pumps between pump sections that pump fluid to a turbomachine to generate rotation and acts as a hydraulic motor downhole. In another illustrative embodiment of the invention the turbo machine is rotated on a motor shaft to generate horse power to reduce a horsepower required from the motor turning the motor shaft. In another illustrative embodiment of the invention a system and method are disclosed for a turbomachine that pumps and filters hydrocarbons. The filter separates fluid from solids. A system and method are disclosed that pumps and compresses hydrocarbons. A system and method are disclosed that pumps fluid to a turbomachine to generate rotation and acts as a hydraulic motor downhole.

Figure 1:
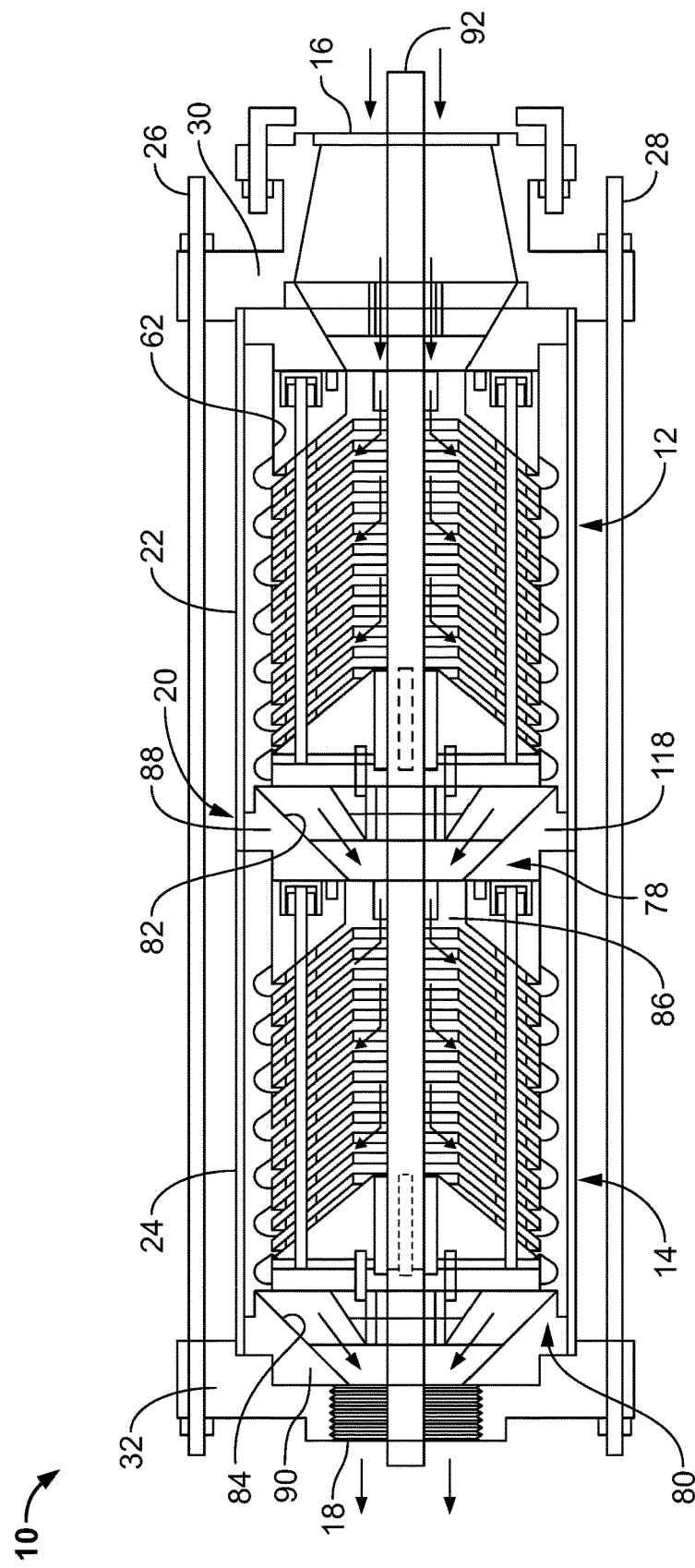
FIG. 1 is an elevational view, in section, showing two stages of a boundary layer turbine pump in accord with one possible embodiment of the present invention.

The figures are exemplary only and not intended to limit the scope of the invention.

DETAILED DESCRIPTION

A bladeless rotary machine method and apparatus are disclosed. The terms "bladeless rotary machine", "rotary machine" and "turbomachine" are used synonymously herein to indicate a machine that transfers energy between a rotor and a fluid, including turbines, compressors and motors. In particular, illustrative embodiments, turbomachinery and methods are disclosed for a bladeless rotary machine wherein fluid is directed axially within the body. In different illustrative embodiments, the bladeless rotary machine is used as both a motor and/or a pump/compressor. When used as a pump, a bladeless rotary machine body receives fluid, wherein fluid is directed axially within the pump body to produce an axial output. When used as a compressor, a bladeless rotary machine body receives fluid as gas wherein fluid is directed axially within the pump body to produce an axial output. When used as a motor, fluid passing in a reverse direction relative to the pump output, is forced through the rotary machine body to produce kinetic rotational energy to impart rotational energy to drive another equipment attached to bladeless rotary machine. The bladeless rotary machine includes but is not limited to a rotor that includes but is not limited to a plurality of axially-spaced apart rotor elements. In a particular embodiment, the rotor elements are disks. In another embodiment, the bladeless rotary machine body includes but is not limited to a rotor that includes but is not limited to a plurality of spaced apart rotor elements that in one illustrative embodiment are conical elements.

In one particular embodiment, a bladeless rotary machine is disclosed that creates a vortex for discharge that facilitates downhole fluid separation. The nature of the vortex allows the centrifugal force to naturally separate the fluids where the heavier particles are moved to the outer wall of the vortex and lighter fluids, including but not limited to a gas is moved to the inner wall of the vortex toward a central drive shaft. In a downhole environment, wherein the turbomachine is submerged in a subterranean hole (also referred to herein as a "wellbore" drilled in the earth for the recovery of hydrocarbons), ports are provided to separate solids and heavier particles from a fluid pumped by the turbomachine and thus substantially removes solids from the fluid. The remaining fluids after the solids are removed is produces or transported to the surface of the Earth as a liquid and gas. In an illustrative embodiment, the heavier particles (i.e., solids) are ported from the outer perimeter of a vortex of fluid formed by the spinning turbomachine rotor and returned down hole. The lighter fluid and gas are ported from the center of the vortex and transported (pumped) through a wellbore or pipeline to the surface. In a pipeline environment, heavier particles are separated and ported from a fluid pumped in the pipeline. In one embodiment, the solids are ported back down the well bore.

In an illustrative embodiment, the turbomachine is provided as a fluid separator (also referred to herein as a "filter") to provide cleaned-up multiphase fluid wherein the turbomachine substantially removes solids and heavier particles from the multiphase fluid by creating a spinning vortex multiphase fluid created by the spinning turbomachine rotor. The multiphase fluid contains gas, liquid and solids. In another embodiment, the turbomachine is provided as a fluid separator, wherein fluid and solids are separately ported from the vortex before the multiphase fluid is pumped by another centrifugal pump, which can be a conventional pump in capable of efficiently pumping multiphase fluid containing solids and liquid. Removing the solids (also referred to herein as "particles") from the multiphase fluids in the turbomachine, to create "cleaned up" fluid, enables use of standard pumps that can pump the cleaned-up fluid but would suffer inefficiencies such as deterioration from impingement if the standard pump pumping the multiphase fluid containing solids before it is processed by the turbomachine to produce cleaned-up fluid.

In another embodiment, the bladeless rotary machine is a multi-stage compressor with no pistons or blades which increases the reliability over a standard type gas compressor. In another embodiment, the bladeless rotary machine is used as a multi-stage compressor to increase gas yield in a downhole environment, wherein downhole gas is compressed downhole by the bladeless rotary machine and compressed gas pumped up hole, where the gas is stored in a compressed state, eliminating a need for a gas compressing station on the surface. In an illustrative embodiment, the compressor increases the pressure of the gas and thus increases the density and amount gas being pumped. In another embodiment, the bladeless rotary machine is used as a multi-stage compressor that is used in pipelines to boost flow. In another embodiment, the bladeless rotary machine is used as a multi-stage pump that is used in pipelines to boost flow. In another illustrative embodiment the bladeless rotary machine is used as a jet engine which is less subject to wear and damage than a blade rotary machine from impingement of foreign objects from sand, birds, etc. The multi-stage bladeless rotary machine is substantially more resistant to damage from impingement of foreign objects from sand, birds, etc.

In another illustrative embodiment, the bladeless rotary machine is a sewage pump. The bladeless rotary machine sewage pump can pump larger solids than a normal centrifugal pump can handle. In another illustrative embodiment, the bladeless rotary machine is an injection pump. High pressure pumping from surface to deep downhole being able to handle pressure changes, cavitation and solids. In another illustrative embodiment, the bladeless rotary machine is a multi-stage generator. In another illustrative embodiment, the bladeless rotary machine any rotary machine application.

In another illustrative embodiment, the bladeless rotary machine is a coal pump. In another illustrative embodiment, the bladeless rotary machine is a multi-stage coal pump that substantially increases a distance that the coal solids and slurry can be pumped. In another illustrative embodiment, the bladeless rotary machine is a gravel pump. In another illustrative embodiment, the bladeless rotary machine is a multi-stage steam pump. The multi-stage steam pump is multi-staged and therefore enables using a smaller in diameter pump than a single stage rotary machine.

In another illustrative embodiment, the bladeless rotary machine is a mining dewatering pump. The bladeless rotary machine used for mining dewatering carries heavy and abrasive particles with substantially less wear and impingement. In another illustrative embodiment, the bladeless rotary machine is used for in situ mining wherein an acid solution is applied to mine tailings. The acid leaches metal from the tailing ore and car recover much more the heavy metal (e.g., copper or gold). This is a very acidic and abrasive solution to pump into the plating process and the bladeless rotary machine handles with substantially less wear and impingement.

In another illustrative embodiment, the bladeless rotary machine is used for substantially silent ship propulsion wherein cavitation is substantially reduced due to the non-propeller design for propelling a ship.

In another illustrative embodiment, the bladeless rotary machine is used as a hydraulic motor that can be used to drive other equipment. Introducing hydraulic fluid into the turbomachine in an opposite direction from the pump output, that is pumping fluid into the turbomachine's output, causes the bladeless rotary machine to perform as a hydraulic motor. In another embodiment, the turbomachine hydraulic motor drives drill bits, pumps and compressors in a reduced diameter slim hole environment.

In another illustrative embodiment, the bladeless rotary machine motor is used to provide high pressure drilling mud to a drill bit. In another illustrative embodiment, the bladeless rotary machine is used to remove drill cuttings that are associated with a drilling process which are highly abrasive and in a slurry condition.

In an embodiment, the spacing between the rotor elements in the turbomachine, which can be disks and conical elements, is dynamically adjustable to accommodate efficiently moving or pumping varying density fluids moving through the bladeless rotary machine when used as a pump. The spacing between the disks or conical elements is adjusted to accommodate efficiently generating rotational kinetic energy as a motor generated from moving varying density fluids moving through the bladeless rotary machine when used as a motor. When used as a pump, the conical elements and disk elements rotate to impart acceleration of a working fluid through the spaces between the disks or conical elements using boundary layer adhesion techniques. The working fluid, which can be a liquid, a gas or a liquid containing solids, is smoothly directed to any number of subsequent boundary layer pumping or motor stages which are axially positioned with respect to each other. The working fluid is typically a multiphase fluid containing liquid, gas and solids.

For lower density fluids, such as gas having a low fluid density (FD), the axial distance (d) between the rotor elements, (e.g., conical and disk elements) is adjusted to be smaller than a distance d between the conical and disk elements when a heavier fluid is passing through the rotary machine.

In another illustrative embodiment, the bladeless rotary machine pump is equipped with a dynamically length adjustable shaft element wherein an axial distance between adjacent rotor elements on the dynamically length adjustable shaft is adjustable so that the characteristics of the bladeless rotary machine pump are adjustable for different characteristics of the multiphase fluid being pumped. When adjacent rotor elements are farther apart, the flow path between the adjacent rotor elements is wider. The wider flow paths between adjacent turbomachine rotor elements can more efficiently handle higher density fluids and multiphase fluids containing solids than narrower flow paths that are provided between the rotor elements when the adjacent turbomachine rotor elements are closer together. In another particular illustrative embodiment, the density of the multiphase (fluids, fluids bearing solids, solids and gas) being pumped is monitored and the distance between the adjacent rotor elements, e.g., disks is adjusted to accommodate the density of the medium being pumped to increase the efficiency of the bladeless rotary machine pump. In another illustrative embodiment, the axial distance between the adjacent rotor elements is adjusted so that a first distance between the disks is greater for higher density mediums such as multiphase fluids containing solids. In another illustrative embodiment, the distance between the adjacent rotor elements is adjusted to a second distance so that the distance between the disks is less than the first distance for higher density mediums such as fluids. In another illustrative embodiment, the distance between the disks is adjusted to a third distance so that the axial distance between the disks is less than the first and second distances for lower density mediums such as gas. In another illustrative embodiment, each distance axial distance between beach disk and conical element is individually adjustable.

In another illustrative embodiment, a turbomachine motor is provided and equipped with a dynamically length adjustable shaft wherein the distance between adjacent rotor elements on a dynamically length adjustable shaft in the turbomachine motor are adjustable so that the characteristics of the bladeless rotary machine motor are adjustable for different characteristics of the medium being used to drive the bladeless rotary machine as a motor. In another particular illustrative embodiment, the fluid density (FD) of the medium (multiphase fluids, liquids, fluids bearing solids, solids and gas) being supplied to the turbomachine motor is monitored and the distance between the adjacent rotor elements is adjusted to accommodate the fluid density of the medium being supplied to the turbomachine motor to increase the efficiency of the turbomachine motor. In another illustrative embodiment, the distance between the adjacent rotor elements is adjusted so that a first distance between the adjacent rotor elements is greater for higher density mediums such as multiphase fluids containing solids. In another illustrative embodiment, the distance between the disks is adjusted to a second distance so that the distance between the adjacent rotor elements is less than the first distance for lower density mediums such as gas, fluids in liquid form and fluids substantially not containing solids. In another illustrative embodiment, the distance between the disks is adjusted to a third distance so that the distance between the disks is less than the first and second distances for lower density mediums such as gas.

In another illustrative embodiment, a bladeless rotary machine is used both as a motor and as a pump downhole. In another illustrative embodiment, two bladeless rotary machines are provided on a drill string downhole, a first bladeless rotary machine is used as a motor downhole and a second bladeless rotary machine is used as a pump downhole. In another illustrative embodiment, two bladeless rotary machines are provided on a drill string downhole, a first bladeless rotary machine is used as a motor downhole and a second bladeless rotary machine is used as a pump with a solids port for returning solids downhole.

Fluid Density (FD) is inversely proportion to the American Petroleum Institute (API) gravity. API gravity is a scale expressing the gravity or density of liquid petroleum products. The measuring scale is calibrated in terms of degrees API; it is calculated as follows:

$$\text{Degrees API} = (141.5/(sp.gr.60°\ F./60°\ F.)) - 131.5$$

The higher the API gravity, the lighter the compound. Light crudes generally exceed 38 degrees API and heavy crudes are commonly labeled as all crudes with an API gravity of 22 degrees or below. Intermediate crudes fall in the range of 22 degrees to 38 degrees API gravity.

One of the major problems associated with oil and gas production is the large volume of produced water. Operators around the world are facing significant costs with the treatment and disposal of produced water. Downhole separation, has been developed to reduce the costs of produced water and increase oil production. Downhole separation is the technique where oil and gas from the produced water is separated at the bottom of the well and reinject a portion of the produced water into another formation, while the oil and gas are pumped to the surface. The reduction in cost can attributed to the downhole treatment of the produced water since most of the topside produced water treatment facilities are reduced in number. Since most of the produced water does not reach the surface this creates an added value of minimizing the opportunity for contamination of underground sources of drinking water through leaks in casing and tubing during the injection process.

One illustrative embodiment of the present invention discloses a bladeless rotary machine as it applies to fluid pumping problems. However, it will be understood that general mechanical structures utilized in the bladeless conical radial rotary machine of the present invention may be implemented in various types of turbo-machinery and the present invention is not intended to be limited to a particular type of rotary machine implementation.

Unlike more traditional pumps which utilize vanes, blades, augurs, buckets, pistons, gears, diaphragms, and the like, boundary layer pumps, such as those described by Tesla, may typically utilize multiple rotating parallel flat disks. Bladeless or boundary layer pumps operate to pump fluids by utilizing the fluid properties of adhesion and viscosity. These fluid properties create an interaction between the fluid and the rotating flat disks of the boundary layer or bladeless pump whereby the mechanical energy of the rotating rotary machine may be imparted to the fluid to induce the fluid to flow through the pump housing.

Boundary layer pumps, also referred to herein as "turbomachines" have been reported to have some significant advantages over the more traditional pumps especially when utilized for pumping fluids other than cool, clean, homogenous liquids. The vanes, buckets, or the like, of traditional pumps wear and lose effectiveness due to normal friction and/or impingement with particles such as sand or other abrasives. However, the flat surfaces of boundary layer pumps are much less susceptible to wear and may have little or no wear even after extended use. Boundary layer pumps have been found to be especially effective for pumping high viscosity fluids wherein the efficiency of such pumps may increase as the fluid viscosity increases. Boundary layer pumps have also been reported to be more cost effective in terms of reliability and decreased downtime for pumping problematic multiphase fluids, which may comprise gases, liquids, and/or solid materials. Boundary layer pumps have been found to greatly reduce maintenance costs and downtime when used to replace more traditional pumps. Moreover, the tolerances of the flat disks for boundary layer pumps tend to be much looser than those required for operation of more traditional pumps thereby resulting in higher reliability. Traditional centrifugal pumps rely on narrow internal clearances with close tolerances to maintain the pressure in the pump needed for maximum efficiency. These tolerances may wear away quickly in abrasive fluid pumping service so that these traditional design pumps steadily lose efficiency and eventually fail. Traditional pump manufacturers sometimes make more income from replacement components due to wear and failure from operating in a harsh pumping environment than on the sales of original pumps.

Due to the absence of spinning blades or impellers, boundary layer pumps are more gentle on sensitive fluids pumped e.g. shear-sensitive fluids. As an example, boundary layer pumps have been found to pump water containing live fish without harming the fish. Other problems related to traditional axial, centrifugal, and mixed flow pumps include problems relating to cavitation. Cavitation describes a vacuum-like condition in the pump which can occur when liquid in the low-pressure area of the pump vaporizes. Vapor bubbles implode as they pass to regions of high pressure and can create a shock wave powerful enough to lift metal off the pump. The energy required to accelerate the liquid to high velocity and fill the void left by the bubbles causes a drop-in capacity. In a boundary layer pump, because the fluid flow changes are kept as gradual as possible, with laminar flow rather than turbulent flow, the risk of cavitation is greatly reduced.

As discussed briefly above, impingement damage is produced by solids which engage the vanes of a pump and erode it. The higher the angle of impingement between the particle and the vane, the greater the damage, with a ninety-degree impingement angle being the most damaging. Traditional pumps are sometimes operated at lower speeds to reduce impingement wear, but lower speeds result in lower fluid flow and lower horsepower. In a boundary layer pump, with smooth disks, the impingement damage is substantially reduced or substantially eliminated due to laminar flow over the disks with a substantially zero-degree impingement angle. Boundary layer pumps can be operated at high speeds substantially without impingement damage.

Other problems related to more traditional pumps include vapor lock problems, and pump efficiencies being limited by affinity laws. The flow to head ratio is often restricted by design limitations in traditional pumps. Turbulent flow in the stage to stage transition can be problematic. The down thrust loading developed in some applications can be excessive. Radial and side loading thrust is often inconsistent relative to rotational speed. Upon startup, up thrust can be detrimental to the ultimate balance of the pump. Stated more generally, traditional pumps are highly subject to vibrations as a natural result of impact of the vanes and blades with the fluids pumped. This vibration problem is exacerbated when multiphase fluids are pumped that may include solids, liquids, and gases. Accordingly, the shaft rotation speed of traditional pumps, especially those used for pumping multiphase fluids, is limited to avoid destroying the pump due to vibrational damage. The limited shaft rotational speeds result in lower pump output, limited horsepower, and generally less pumping capability. On the other hand, boundary layer pumps, also referred to herein as "turbomachines", such as the Tesla pump, use flat smooth disks which may be easily balanced and produce little or no vibration when spinning within a fluid even at relatively much higher rotational speeds. Typical boundary layer pumps do not utilize lifting surfaces on the rotating elements. Higher rotational speed is directly related to pump flow rates so that boundary layer pumps permit significantly increased pump rotation speeds when pumping multiphase fluids which may contain solids, liquids, and gases. Moreover, boundary layer pumps have been found to not only increase the output under these difficult pumping conditions as compared to traditional pumps, but also have been found to be much more reliable.

Despite the many advantages of boundary layer pumps over more traditional pumps for pumping multiphase fluids, and despite commercial usage and considerable interest in boundary layer pumps since their invention by Tesla in 1913, solutions to certain multiphase fluid pumping problems utilizing boundary layer pumps have never been found. One example of such pumping problems is found in the oilfield, where it is desirable that multiphase hydrocarbon fluids be pumped in a continuously upward direction from the production zone of a well through a relatively small wellbore to the surface. In pumps for wellbores, it is therefore desirable that the pump have a small diameter to fit within the wellbore. Moreover, pumps with an axial discharge are more efficient for moving the fluid up the borehole within the confined space of the wellbore and/or production tubing.

The inventors teach herein a novel turbomachine pump, motor and compressor design which may be utilized as a downhole pump, motor and compressor that provides the advantages of a boundary layer pump, motor and compressor better suited to handling multiphase fluids with solids, liquids, and gases which are typical of oil and gas wells as compared with downhole pumps based on traditional pump designs. The novel pump may comprise an axial discharge that may efficiently utilize a straight tubular pump housing whereby fluid is moved through the tubular housing. Moreover, the inventors have determined that it may be desirable that the novel pump design of the present invention permit axial interconnection of any number of identical or substantially identical axial flow pump stages to thereby increase the pumping head as desired while keeping the flow rate constant, as is also highly advantageous for wellbore pumping applications where the fluid must be pumped to the surface from significant depths.

Referring now to the figures, and more particularly to FIG. 1, which is taken from U.S. Pat. No. 7,192,244, there is shown an illustrative embodiment of multistage boundary layer pump 10. Pump 10 as shown comprises first boundary layer pump stage 12 and second boundary layer pump stage 14 axially interconnected together. The details and operation of multistage boundary layer pump 10 which permit the unique end-to-end interconnection of multiple boundary layer pump stages is discussed hereinafter. While only two boundary layer pump stages are shown in FIG. 1, it will be understood that many more boundary layer pump stages may be interconnected end-to-end in a similar manner as that shown in FIG. 1. Moreover, each subsequently connected boundary layer pump stage may be identical or substantially identical to the second boundary layer pump stage 14, if desired. First boundary layer pump stage 12 may utilize a different inlet 16 to mate with surrounding equipment as desired. Accordingly, for use in submersible wellbores to pump fluids from a significant depth to the surface, the number of boundary layer pumps utilized may be selected to provide the desired pumping head while still maintaining the flow rate of each pump.

As a general overview of operation of an illustrative embodiment of the turbomachine, a fluid enters multistage boundary layer pump 10 at fluid inlet 16, travels through tubular housing 20, and exits at fluid outlet 18. Tubular housing 20, in this embodiment, comprises a first tubular housing section 22 for boundary layer pump stage 12 integral to a second tubular housing section 24 for boundary layer pump stage 14. If desired, each stage might comprise individual housing sections which are inter-connectable together rather than a single tubular housing for the multiple boundary layer pump stages. Fluid flow arrows indicate generally the direction of fluid flow through multistage boundary layer pump 10.

An outer support frame comprising bolts 26 and 28 which secure end pieces 30 and 32 together on opposite ends of tubular housing 20 is shown and may be used for conveniently testing, changing out components, and changing the number of boundary layer stages of multistage boundary layer pump 10 as desired. However, the outer support frame may be modified, eliminated, or altered as desired depending on the preferred usage of multistage boundary layer pump 10.

Figure 2:
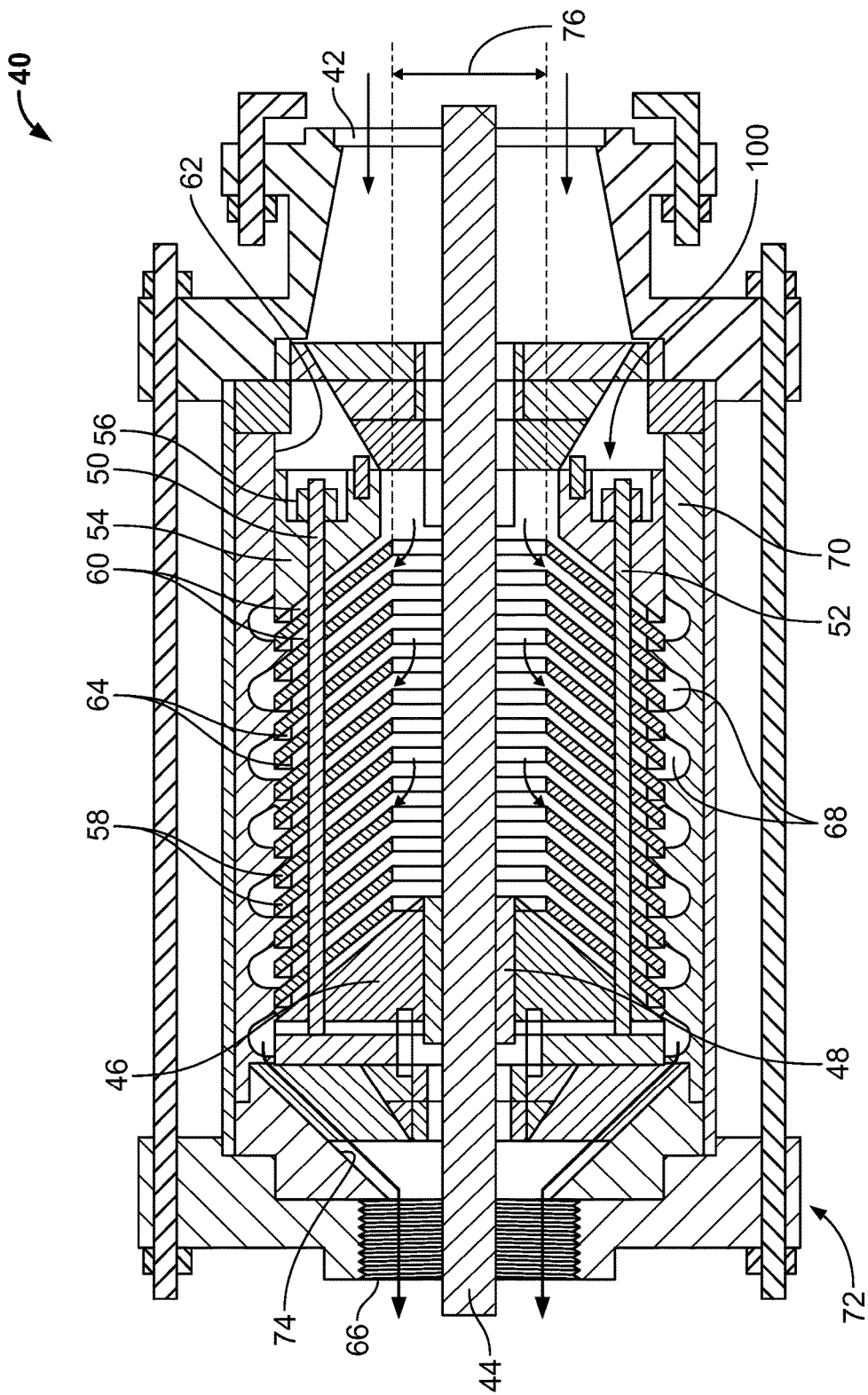
FIG. 2 is an enlarged view of a single stage boundary layer turbine pump in accord with one possible embodiment of the present invention.

An enlarged view of one possible embodiment of a first boundary layer pump stage 40 is shown in FIG. 2 which is taken from U.S. Pat. No. 7,192,244. Operation of all boundary layer stages utilized in a multiple stage boundary layer pump may preferably be substantially the same although as noted above the suction pump inlet 42 for the first boundary layer pump stage may be varied in some applications as may be desired such as for interconnecting with existing or standard equipment.

In this illustrative embodiment, drive shaft 44 extends through first boundary layer pump stage 40 and may be driven by a motor (shown in FIGS. 3, 5 & 6 below) such as a downhole submersible pump drive motor. The motor is a variable speed motor in another embodiment, discussed below in relation to FIGS. 3, 5 & 6. Drive shaft 44 may then be utilized to rotate end cone 46. In this embodiment, keys 48 secure drive shaft 44 to end cone 46 for rotation therewith but other suitable means may also be utilized for this purpose. Through bolts or studs, such as bolts or studs 50 and 52, extend from end cone 46 to end ring 54 where they may be secured utilizing threaded nuts such as threaded nut 56. A plurality of circumferentially spaced bolts including bolts 50 and 52 may be utilized for this purpose. The bolts are utilized to secure rotor elements 58 in position to form the pump rotor 100. The radial positions, diameter, cross-sectional shape, number, and other features the bolts may be altered as desired. Various different means are known for securing rotor elements together and/or to rotor 100 and/or to a drive shaft. Accordingly, other means may be utilized for securing rotor elements to form pump rotor 100. In this embodiment, fifteen substantially identical rotor elements 58 are secured between end cone 46 and end ring 54. In the present illustrative embodiment, the rotor elements are conical shaped. The rotor elements 58 may be spaced axially apart from each other utilizing spacers 60 positioned between each rotor element. It should be mentioned here that while it is anticipated that rotor elements are secured together, that the general means for doing so, the shapes of the rotors including internal and external profiles, the shape of internal wall 62 (shown in this example to be substantially cylindrical except for rifling or spiral grooves) may vary. Each rotor element 58 may vary in size or shape. In this embodiment, each of spaced apart radial fluid flow paths 64 are defined by rotor elements 58 are substantially parallel with respect to each other but this may not be the case if different size, width, shaped, internal diameter, or external diameter rotor elements are utilized.

However, in accord with a presently illustrative embodiment of the present invention at least some, and more likely all rotor elements 58 may preferably comprise at least a portion thereof which is conical or dome-shaped for purposes of producing within a limited space or diameter an axial flow component for fluid which is also directed radially outwardly in the plurality of radial fluid paths 64 defined between the axially spaced apart rotor elements 58 to thereby provide an axial discharge boundary layer pump. As used herein, conical refers to a three-dimension cone, or portion thereof, with sides which may be defined by straight lines. Dome-shaped is used to describe any curved, convex, concave, s-curved, exponential curve, variable curve or other shape elements or portions thereof which are radially symmetrical as viewed from the end.

If unlimited space were available, and if axial pump multi-staging were unnecessary, then the direction of fluid flow from a prior art boundary layer pump could simply be changed by gradual bends in the output pipeline in which the fluid flows without significantly affecting the energy that had been imparted to the fluid. However, by utilizing the axial flow component imparted to the fluid, the pressurized fluid may be directed within the confines of the pump chamber itself to an axially positioned outlet, such as fluid outlet 66, and thereby provide an axial discharge for boundary layer pump 40 in accord with the present invention. The subsequent discussion lists several components of boundary layer pump 40 which may be utilized in concert but which may also be used independently for smoothly directing the fluid flow axially. As Tesla noted, to effect efficiency in a boundary layer pump, sudden changes in velocity while the fluid is receiving energy from rotor 100 should be avoided. Accordingly, in one embodiment of the present invention, boundary layer pump 40 comprises components as discussed in more detail hereinafter which are designed to cooperate to impart kinetic energy to fluid from rotor 100 and to increase the axial velocity component of the fluid flow by directing of fluid movement in as smooth manner a manner as possible and without decreasing the overall magnitude of the kinetic energy (one-half mass times velocity squared) and/or the total kinetic and potential energy imparted to rotor 100. Energy is imparted from rotor 100 to the fluid as the fluid is carried by rotor 100 in accord with boundary layer pump operation and as the fluid is accelerated radially outwardly by rotor 100. Other discussions of boundary layer pumps, some of which are provided herein, are available to show that the radial distance or radius of rotor 100 and the rotational speed of rotor 100 largely determine the amount of energy imparted from rotor 100 to the fluid. Bournelli's equation which relates pressure, speed, and height at two points in a steady-flowing, non-viscous, incompressible fluid provides some insights into transforming the energy imparted to the fluid by rotor 100 such that the axial component of velocity may be increased in the present invention as desired to provide an axial discharge boundary layer pump within a confined space.

$$P_1 + \tfrac{1}{2}\rho_1 v_1^2 + \rho_1 g y_1 = P_2 + \tfrac{1}{2}\rho_2 v_2^2 + \rho_2 g y_2$$

where P=pressure,
v=velocity
.rho.=density
g=gravitational force
y=height
and ½.rho.v.sup.1 =kinetic energy;
where in boundary layer pump 40 the velocity vector has an axial component and a radial component and an overall magnitude.

In the illustrative embodiment shown in FIG. 1 and FIG. 2, rotor elements 58 are conical rings which are angled at forty-five degrees with respect to the axis of rotation of rotation. In this embodiment, the boundary layer effect induces fluid flow through radial passageways 64 at an angle of forty-five degrees. In one embodiment of the invention, a plurality of spiraling fluid paths 68 are provided which encircles rotor 100 and receive the fluid flow to which energy has been imparted so as to smoothly guide the fluid flow toward fluid outlet 66. While one presently illustrative embodiment is shown, it will be understood that the invention is not limited to this particular configuration. Numerous different possibilities exist for variations in wall 70, radial flow paths 60, and fluid paths 68 to provide a fluid with kinetic energy wherein the axial velocity vector component may continuously increase without decreasing significantly the magnitude of the kinetic energy while experiencing the benefits of a boundary layer pump.

As one possible construction variation, the angle of the spiral fluid paths may change. For instance, it may be desirable that the angle of the spiral of fluid path 68 smoothly increase as the fluid flow path nears fluid output 66 so that the axial velocity component of the kinetic energy increases significantly by gently redirecting the direction of flow path 68. This could be matched, if desired, by a decreasing angle of radial flow paths 60 formed between rotor elements 58, e.g. down to thirty degrees' or any other selected angle. Alternatively, radial flow paths 60 may be oriented to be greater than forty-five degrees, e.g. sixty degrees whereby the magnitude of the velocity vector in the radial direction may be initially increased as compared to the velocity vector in the axial direction. The angle of spiral fluid path 68 may then be utilized to smoothly redirect the direction of the fluid flow axially without significantly reducing so produced fluid kinetic energy. Moreover, instead of one or more spiral fluid paths 68 formed within wall 70, a volute region around rotor 100 may be utilized with wall 70 being substantially smooth. Or a combination of a volute section and fluid spiral paths 68 may be utilized. Moreover, while wall 70 is shown as cylindrical in this embodiment, wall 70 could have other preferably smooth shapes such as rounded, venturi-shaped, concave, or the like, as desired, to thereby gradually direct fluid in the desired direction such as to provide an axial discharge from boundary layer 40. Moreover, wall 70 may also be conical so that in combination with an increasing angle of fluid path 68 and radial flow paths 60 the energy in the fluid is increasingly directed axially to smoothly direct the overall fluid radially inwardly before leaving outlet 66. It will be noted that in one presently illustrative embodiment as shown in FIG. 1 and FIG. 2 transition section 72 may include conical wall 74. In yet another embodiment, spiral grooves 68 may not be utilized at all whereby the shape of internal wall 62, which may be cylindrical, conical, venturi-shaped or the like may be utilized to largely redirect the energy of the fluid flow in the axial direction. Accordingly, while one possible embodiment of the present invention is as shown, it will be appreciated that numerous constructions and methods may be utilized for providing a compact radial discharge axial pump 40 in accord with the present invention.

Other information concerning boundary layer pumps is relevant for determining the sizes and positioning of various pump components. Pumping effects of features such as inner hole diameter 76 of rotor elements 58, the number of rotor elements 58, rotor element thickness, various means for mounting rotor elements 58 to a shaft (if desired although in the present embodiment the rotor elements are not mounted directly to a shaft), outer volute and housing or volume which surrounds rotor 100 (which for instance would apply to the size of channels 68 in the pictured embodiment but would also apply if channels 68 are not utilized and a volume is provided around rotor 100), inlet 42 and outlet 66 sizes, rotational speeds, the relationship of pressure/volume and horse power, and the general pump formula. The values of these components require knowledge of the particular pumping application. Other helpful boundary layer pump design information may include the unclassified article "Performance of Multiple-Disk-Rotor Pumps with Varied Interdisk Spacings," by Joseph H. Morris, David W. Taylor, Naval Ship R&D Center August 1980, Report No DTNSRDC-80/008, Govt Accession No AD-A088010, Naval Sea Systems Command (SEA 05R14), Washington, D.C. 20362, which describes disk-rotor pumps having various configurations with interdisk spacing ranging from 0.006 to 0.26 inches which were investigated at operating speeds from 3550 to 7000 revolutions per minute whereby operating data for the pumps with the various rotors is provided. It is noted that the report concludes that good performance at wide interdisk spacings was obtained. A review of that data indicates that a fairly wide range of interdisk spacings may be utilized with good pump performance wherein the range utilized may be selected for the fluids to be pumped.

Because boundary layer pump 40 operates on similar boundary layer principals, the above information is useful for determining the various factors for a desired pump output of boundary layer pump 40 in accord with the present invention.

As discussed hereinbefore, in one embodiment of the present invention it is desirable to provide a multi-stage boundary layer pump, one possible embodiment of which is shown in FIG. 1. Accordingly, characteristics of a transition zone, such as transition zone 72 of FIG. 2 or transition zones 78 and 80 in FIG. 1, are utilized to smoothly transition the energy in fluid from one pumping stage to the next pumping stage without substantial energy loss.

In FIG. 1, it is seen that transition zones 78 and 80 comprise conical walls 82 and 84 which smoothly direct fluid flow from the volute or region or channels 22 which surround the rotor. Conical walls provide a simple and smooth transition but other shapes may also be utilized such as concave, convex, s-shaped, french curved walls, and the like, as desired. The diameter of inlet region 86 may be selected as desired based on the relative diameter or combined diameters of channels 22 or the volute region surrounding the rotors to thereby provide as smooth and gradual changes to the fluid velocity and direction as possible. In one embodiment of the invention for use in a wellbore, the outer diameter of housing 20 is approximately four and five eighths inches and relative size of the components shown in FIG. 1 is substantially proportional to that shown. Fifteen rotor elements are utilized per stage with one-eighth inch spacing. In testing of this design, it was found that the best efficiency for 4500 TDH (total dynamic head) was at 1750 BPD (barrels per day). Utilizing water with air infusion it was found stage efficiency was 13% with 1.8 HP (horsepower) at 60 Hz. Existing technology for downhole applications utilize 60 Hz to avoid excessive vibration but multistage boundary layer pump 10 was operated at 90 Hz without noise or vibration. Thus, the flow rates, horsepower, and pumping capabilities can be increased by use of higher RPM. In other testing, with 50% entrained gas in a fluid pumped by pump 10, substantially no cavitation was produced. In prior art, downhole pumps, this amount of gas in fluid can cause significant problems.

Other elements utilized in transition zones 78 and 80 for the present embodiment of boundary layer multistage pump 10 comprise bearing assemblies 88 and 90 for the corresponding rotors. Bearing assembly 110 comprises a radial bearing with stator 114 and diffuser 112. Radial bearing assembly 110 radially supports drive shaft 44 (shown in FIG. 2) or drive shaft 92 (shown in FIG. 1) with respect to the pump. Diffuser 112 mates with the drive shaft and rotates within stator 114 along mating conical surfaces within stator 114 and diffuser 112. Due to the conical surfaces which are also utilized for directing fluid flow, thrust support in one direction along drive shaft 92 is also provided by radial bearing assembly 112. Stator 114 fits between the pumping stages and may utilize ring 118 or other means to axially and radially affix stator 114 with respect to tubular housing 20. Diffuser 112 also acts to maintain laminar flow and smoothly directs the flow from one pumping stage to the next. The fluid flow through radial bearing 110 cools and lubricates the bearing. Within transition sections 78 and 80, the fluid flow is directed to conical surfaces 82 and 84 (see FIG. 1) within stator 114 and preferably through fins of diffuser 112. Fins may preferably be oriented in line with the direction of laminar flow to guide the flow to the next stage. Diffuser 112 may be designed to rotate to good effect as desired. The subsequent stages then start with the released fluid flow and pressure of the previous stage, whereby each stage compounds the pressure to the next stage. The number of stages depends on the total lift required and the head for the application and the volume of the fluid. These are a function of the diameter rotor element 58 rim speed, viscosity, solids (size), the number of rotor elements 58, and the spacing of rotor elements 58. It will be seen that a continuous geometry is utilized through the transition region from the end of the last rotor element 58 to the intake of the first rotor element 58 in the next stages. In one illustrative embodiment, the transition zone provides a continuous spiraling flow that ensures the fluid motion is smoothly directed to the next pumping stage. While radial bearing assembly 110 is a presently illustrative embodiment for downhole pumping, other bearing assemblies may also be utilized.

In summary, referring to multistage boundary layer pump 10 in FIG. 1 generally and FIG. 2 for enlarged component details, fluid flow enters input 16 (FIG. 1) and flows to the rotor elements 58 (FIG. 2) where rotational energy of rotor 100 (FIG. 1) is imparted to the fluid as the fluid is accelerated radially outwardly by rotor 100 through radial flow passages 64 between spaced apart rotor elements 58. The fluid exits rotor 100 in this embodiment into a plurality of spiraling flow paths 68 which surround rotor 100. The fluid has an axial velocity component due to the angle of flow paths 68. The spiraling flow paths may be utilized to maintain laminar fluid flow at about the same axial velocity, if that is the desired design goal. At the end of the spiraling flow paths 68, the fluid is directed along conical surfaces, such as conical surface 82 of stator 80 as shown in FIG. 1 or within stator 114 shown in FIG. 6 wherein stator 114 comprises part of the radial bearing assembly utilized to support the drive shaft. The fluid is therefore smoothly directed to the next pumping stage 14 whereupon the same process occurs and the pump pressure increases.

Turning now to FIG. 2, in FIG. 2, it is seen that transition zones 78 and 80 comprise conical walls 82 and 84 which smoothly direct fluid flow from the volute or region or channels 22 which surround the rotor. Conical walls provide a simple and smooth transition but other shapes may also be utilized such as concave, convex, s-shaped, French curved walls, and the like, as desired. The diameter of inlet region 86 may be selected as desired based on the relative diameter or combined diameters of channels 22 or the volute region surrounding the rotors to thereby provide as smooth and gradual changes to the fluid velocity and direction as possible. In one embodiment of the invention for use in a wellbore, the outer diameter of housing 20 is approximately four and five eighths inches and relative size of the components shown in FIG. 1 is substantially proportional to that shown. Fifteen rotor elements are utilized per stage with one-eighth inch spacing. In testing of this design, it was found that substantial efficiency for 4500 TDH (total dynamic head) was at 1750 BPD (barrels per day). Utilizing water with air infusion it was found stage efficiency was 13% with 1.8 HP (horsepower) at 60 Hz. Existing technology for downhole applications utilize 60 Hz to avoid excessive vibration but multistage boundary layer pump 10 has been operated at 90 Hz without noise or vibration. Thus, the flow rates, horsepower, and pumping capabilities can be increased by use of higher RPM. In other testing, with 50% entrained gas in the fluid pumped by pump 10, substantially no cavitation was produced. The flow rates, horsepower, and pumping capabilities can be decreased by use of lower RPM. In prior art, downhole pumps, this amount of gas in fluid may cause significant problems. The outer diameter of the housing can be enlarged to handle larger solids in the fluid. The outer diameter of the housing can be reduced to handle smaller diameter operations.

Figure 3:
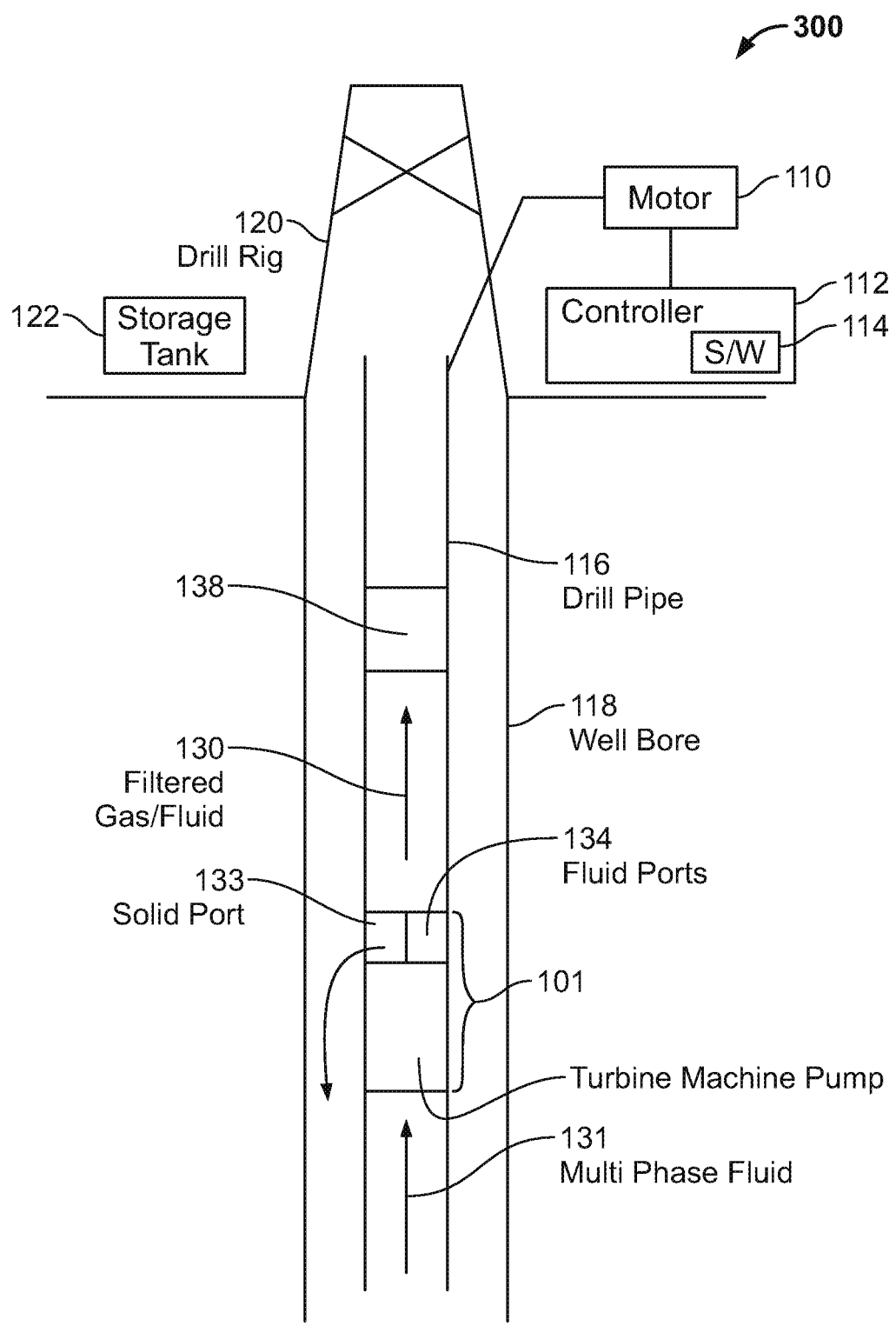
FIG. 3 is a side view of an illustrative embodiment.

Turning now to FIG. 3, as shown in FIG. 3 an illustrative embodiment is shown for pumping a multiphase fluid 131 using a modified version 300 of the turbomachine pump stage 40 which in the present illustrative embodiment is a bladeless turbine pump. As shown in FIG. 3, the turbomachine pump 101 is deployed down a wellbore 118 inside of drill pipe 166 or pipeline attached to a drilling rig 120. A motor 110 is connected to pump 101 to provide rotation to the pump 100. A turbomachine controller 112 (also referred to herein as a turbomachine processor) is in data communication with the motor. Data communication is used herein to mean that analog and digital data is exchanged between the motor 110 and the turbomachine processor 112. The turbomachine processor is in data communication with the motor. In another embodiment sensors on the motor and with sensors and a processor on the turbomachine pump, indicating motor operating characteristics including but not limited to revolutions per minute and current being drawn. The turbomachine processor communicates with the motor processor and stage processor on the turbomachine pump 101. A computer program is stored in computer readable medium 114. The turbomachine processor executes the computer program. The computer program includes but is not limited to computer instructions that are executed by the processor. The turbomachine pump 101 includes but is not limited to a turbomachine pump 101, a fluid port 134 and a solids port 133. Multiphase fluid 131 is pumped from the wellbore 118 through the turbomachine pump 100 located in drill pipe 116. The multiphase fluid includes solids, liquid fluids and fluid gas. The solids are ported from the fluid 131 in pump 101 through solids port 132. Fluids and gas are ported from the fluid 131 in pump 100 through fluid port 134. In a particular embodiment, the turbomachine pump, fluid port and solids port act to clean up the multiphase fluid 131 to provide the filtered gas/fluid 130 ("cleaned-up" fluid) to pump 138 which can be a pump that is not capable of efficiently handling the solids in the multiphase fluid. Each of the embodiments disclosed herein can be deployed in a drill pipe 116 and a pipeline 117.

Figure 4:
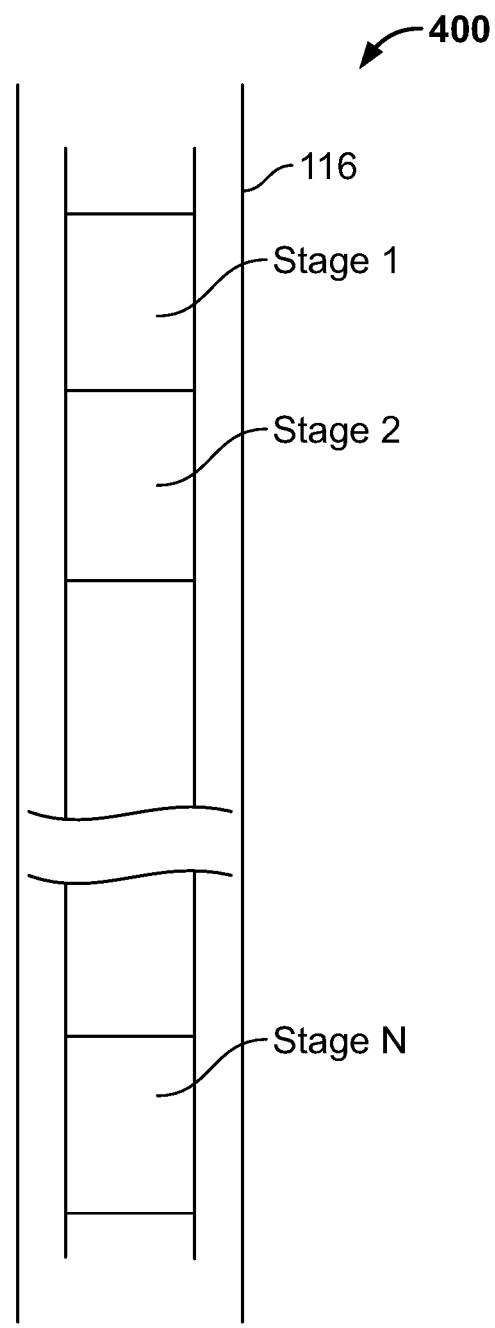
FIG. 4 is a side view of an illustrative embodiment.

Turning now to FIG. 4, an illustrative embodiment 400 of a multi-stage turbomachine pump is illustrated showing pump stages 1-N deployed in a drill pipe 116. Each stage of the multi-stage turbomachine pump feeds a subsequent stage to increase pumping capacity. Each stage of the turbomachine pump is filtered so that the fluid is lighter and contains less solids as it passes through each successive stage of the multi-stage turbomachine pump.

Figure 5:
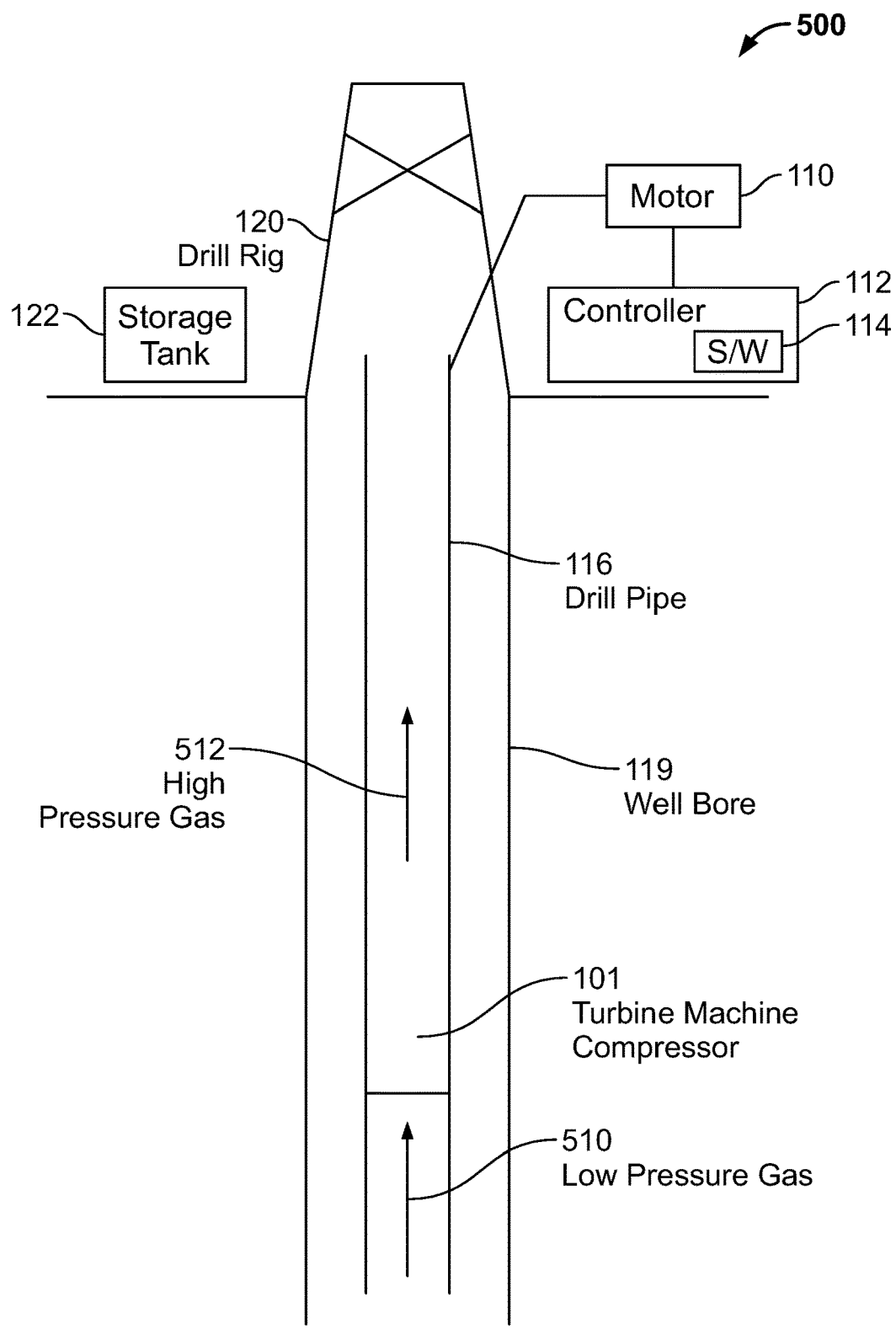
FIG. 5 is a side view of an illustrative embodiment.

Turning now to FIG. 5, an illustrative embodiment 500 of a turbomachine compressor 100 is illustrated. As shown in FIG. 5 the compressor using the turbomachine pump 100 compresses lower pressure gas 510 to form high pressure gas 512. The high-pressure gas 512 is compressed and pumped through the drill pipe 116 to the storage tank 122 and stored under pressure on the surface. The compressor is also deployed in a midstream pipeline for transportation of the high-pressure gas under pressure from the storage tank to a downstream processing plant.

Figure 6:
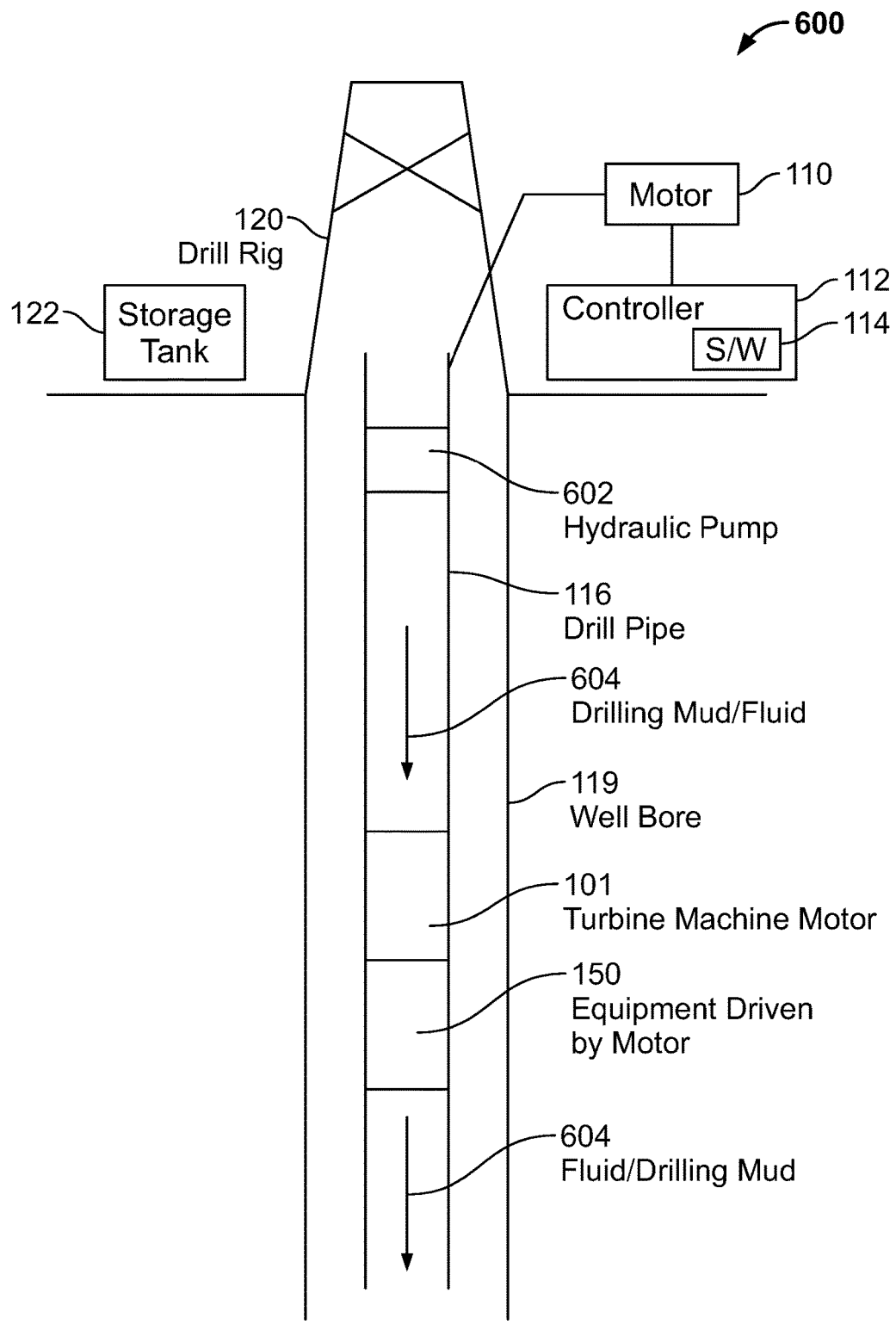
FIG. 6 is a side view of an illustrative embodiment.

Turning now to FIG. 6, FIG. 6 illustrates a side view of an illustrative embodiment, a turbomachine motor 103 is provided. A hydraulic pump 602 provides fluid 604 to the turbomachine motor 103. The fluid 604 flows through the turbomachine motor and causes rotor elements in the turbomachine motor 100 to rotate. As the turbomachine motor rotates, the turbomachine motor drives equipment 150. In one illustrative embodiment, the equipment 150 is a drill bit.

Figure 7:
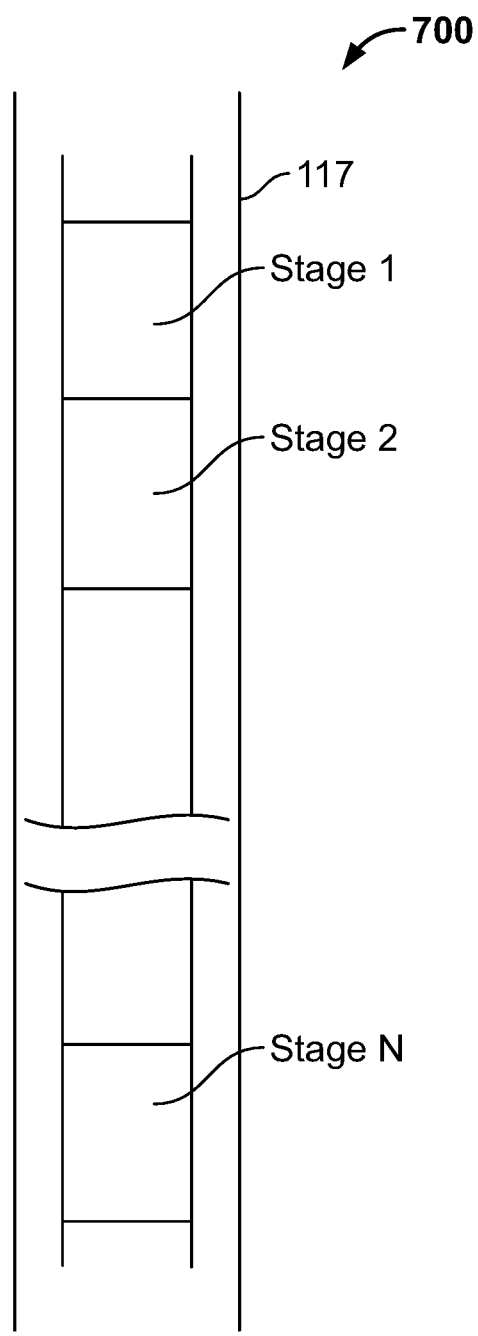
FIG. 7 is a side view of an illustrative embodiment.

Turning now to FIG. 7, a multi-stage turbomachine motor is depicted showing turbomachine motor stages 1-N deployed in a pipeline 117. In another embodiment turbomachine motor stages 1-N deployed in a drill pipe 116. Each stage of the multi-stage turbomachine motor feeds a subsequent stage to increase motor capacity.

Figure 8:
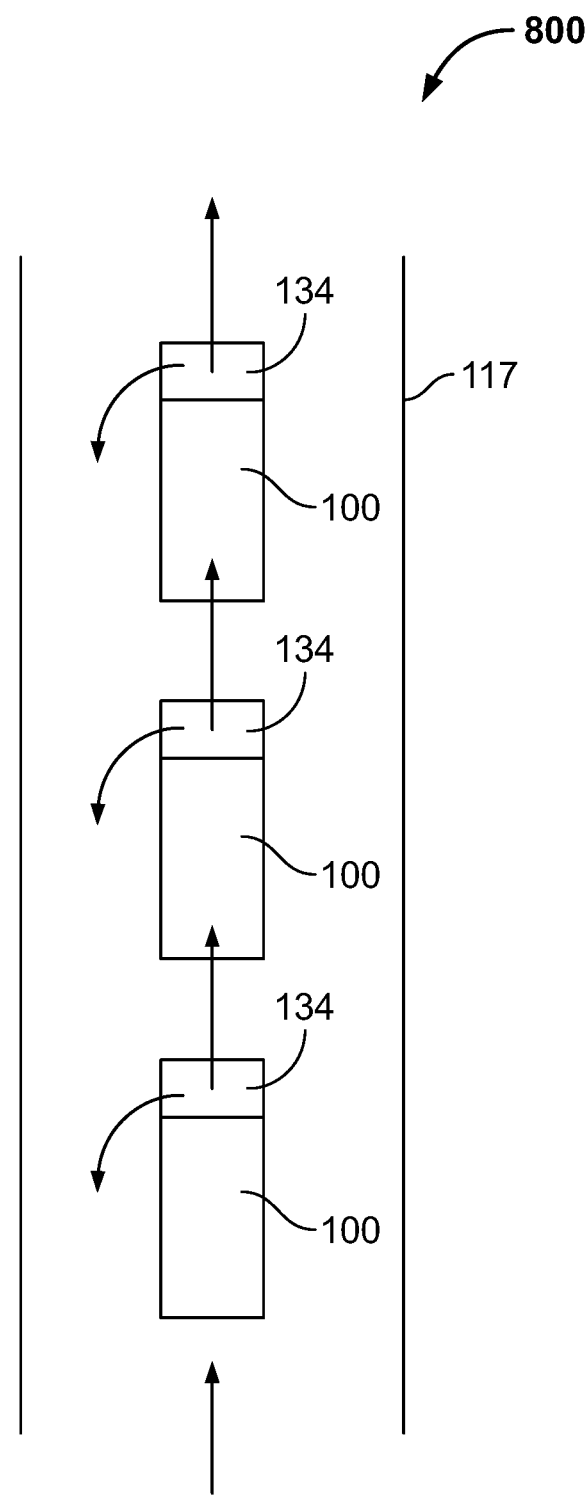
FIG. 8 is a plan view of an illustrative embodiment.

Turning now to FIG. 8, a multi-stage turbomachine pump is depicted showing turbomachine motor stages 1-N deployed in a pipeline 117. In another embodiment turbomachine motor stages 1-N are deployed in a drill pipe 116. Each stage of the multi-stage turbomachine pump feeds a subsequent pump stage to increase pumping and filtering solids capacity. Each stage of the turbomachine pump is filtered so that the fluid is lighter and contains less solids as it passes through each successive stage of the multi-stage turbomachine pump. In an embodiment, the motor 110 is a variable speed motor. In this embodiment, the turbomachine processor sets the speed and path width between rotor elements based on the lighter fluid density, FD. Thus, the lighter the fluid the faster the rpm of the rotor elements driven by variable speed motor 110 as discussed next regarding FIG. 9A and FIG. 9B.

Figure 9A:
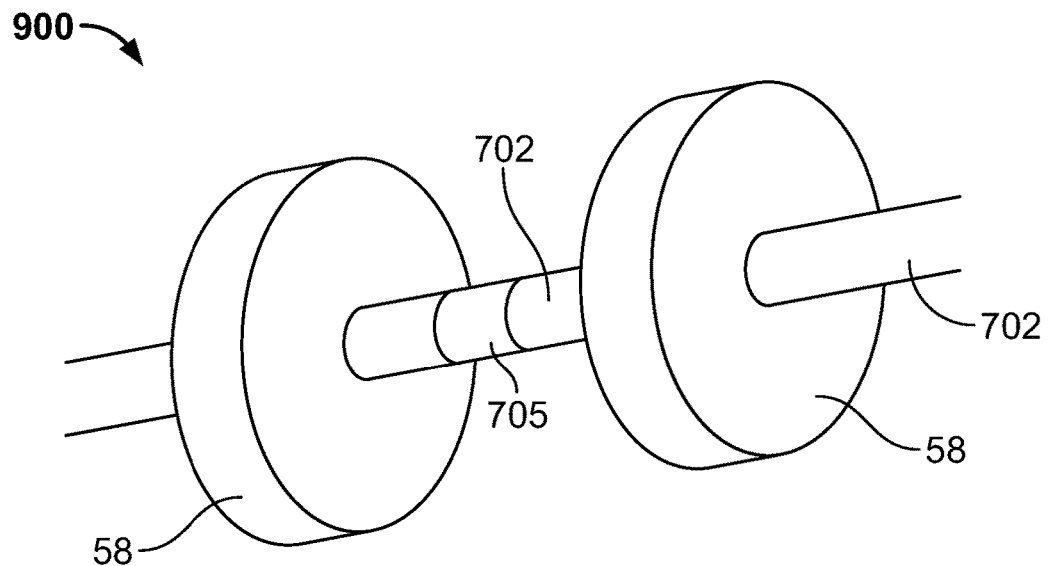
FIGS. 9A and 9B are sectional views of an illustrative embodiment having an auger coupling between sections.
Figure 9B:
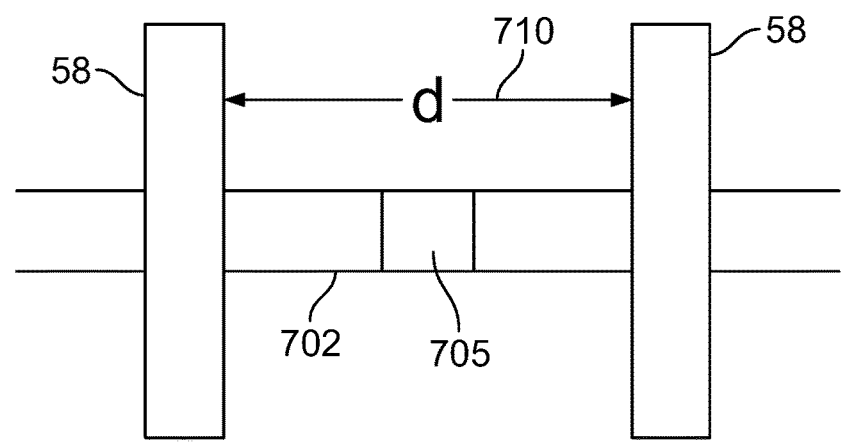

Turning now to FIG. 9A and FIG. 9B, as shown in the schematic depiction of FIG. 9A and FIG. 9B, a distance 710 between the rotor elements 58 (which can be disk and also be conical element is dynamically adjustable to accommodate efficiently moving or pumping varying density fluids moving through the bladeless rotary machine when used as a pump. The spacing "d" 710 between the rotor elements 58 (disks d 710 or conical elements) is adjusted to accommodate efficiently generating rotational kinetic energy as a motor generated from moving varying density fluids moving through the bladeless rotary machine when used as a motor. When used as a pump, the conical elements and disk rotor elements 58 rotate to impart acceleration of a working fluid through the spaces between the disks or conical elements using boundary layer adhesion techniques. The working fluid, which can be a liquid, a gas or a liquid containing solids, is smoothly directed to any number of subsequent boundary layer pumping or motor stages which are axially positioned with respect to each other. The working fluid is typically a multiphase fluid containing liquid, gas and solids. For lower density (D) fluids such as gas, the axial distance d 710 between the conical and disk elements is adjusted to be smaller than a distance d between the conical and disk elements when a heavier fluid is passing through the rotary machine. An axial coupling 705 is provided between the disks to enable adjusting the axial distance between the disks. In an embodiment, the axial coupling is an expandable bellows axial coupling is pressurized to increase the axial distance d 710 between the disk elements 704. In a particular embodiment, the axial coupling is a mechanical axial coupling is actuated to increase the axial distance d 710 between the disk elements 704. In a particular embodiment, the axial coupling is an elastomeric axial coupling is actuated to increase the axial distance d 710 between the disk elements 704.

Figure 10:
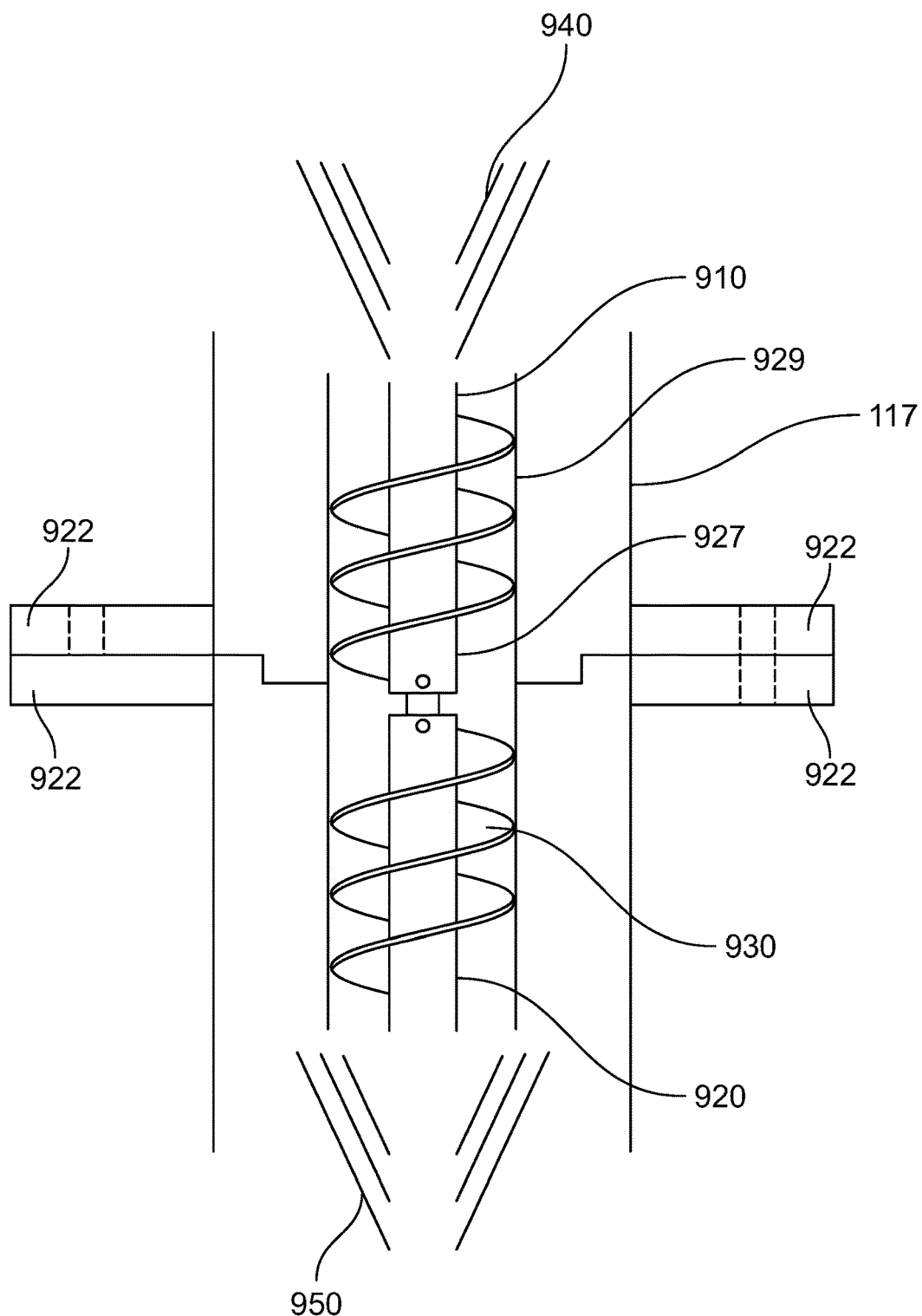
FIG. 10 is a cross sectional view of an illustrative embodiment of an auger coupling.

As shown in FIG. 10, a cross sectional view of an illustrative embodiment of the invention is shown having an auger coupling housing 929 containing an auger coupling to enhance fluid flow between upper pump 940 and lower pump 950 in a pipeline 117, auger coupling housing 929 containing an auger coupling to enhance fluid flow between upper pump 940 and lower pump 950 in a drill pipe 116. In another embodiment, the auger coupling is deployed. In the past, pumps such as pumps 940 and 950 and pump sections 1102 have been connected to each other in a line with solid shaft couplings that do little or nothing to enhance and complement fluid flow between pumps or pump sections. In an illustrative embodiment of the invention, an auger coupling is provided to enhance and complement fluid flow in the coupling section of the pipe line or drill pipe between upper pump 940 and lower pump 950 and pump sections 1102 and help flow by contributing to laminar flow of fluid and gas between pumps 940 and 950 and pump sections 1102 in the coupling section occupied by auger coupling. An auger 930 is formed on the outside a central spline 927. An upper pump 940 and a lower pump 950 shafts 910 and 920 are connected using auger coupling inside of auger coupling housing 929. The central spline receives the lower portion 910 of pump shaft for the upper pump and upper portion 920 of the pump shaft for the lower pump 950. The auger coupling is placed in an adaptor housing 929 that is used to mechanically connect the upper pump and lower pumps to the auger coupling. Flanges 922 formed on the adaptor housing 929 that connect the upper and lower pump and engage the lower pump upper shaft and the lower pump upper shaft. The auger coupling connects the upper and lower sections of a fluid pipe or pipe line containing fluid pumped by the upper and lower pumps. In one particular embodiment, the spline is a hollow tube that allows fluid flow through it. The auger coupling helps insure efficient transfer of fluid flow between pumps or pump sections. The auger coupling compliments fluid flow between pumps or pump sections connected using the auger coupling. In a particular embodiment, the upper and lower pumps can be any type of pump including but not limited to a turbomachine, an auger pump and a centrifugal pump. In a particular embodiment, the auger coupling induces flow between the upper and lower pump. The auger coupling creates additional pumping pressure in the fluid in coupling section between fluid sections. The auger coupling performs lifting work on the fluid in the drill pipe or pipe line as the fluid exits one pump section and enters another pump section.

Figure 11:
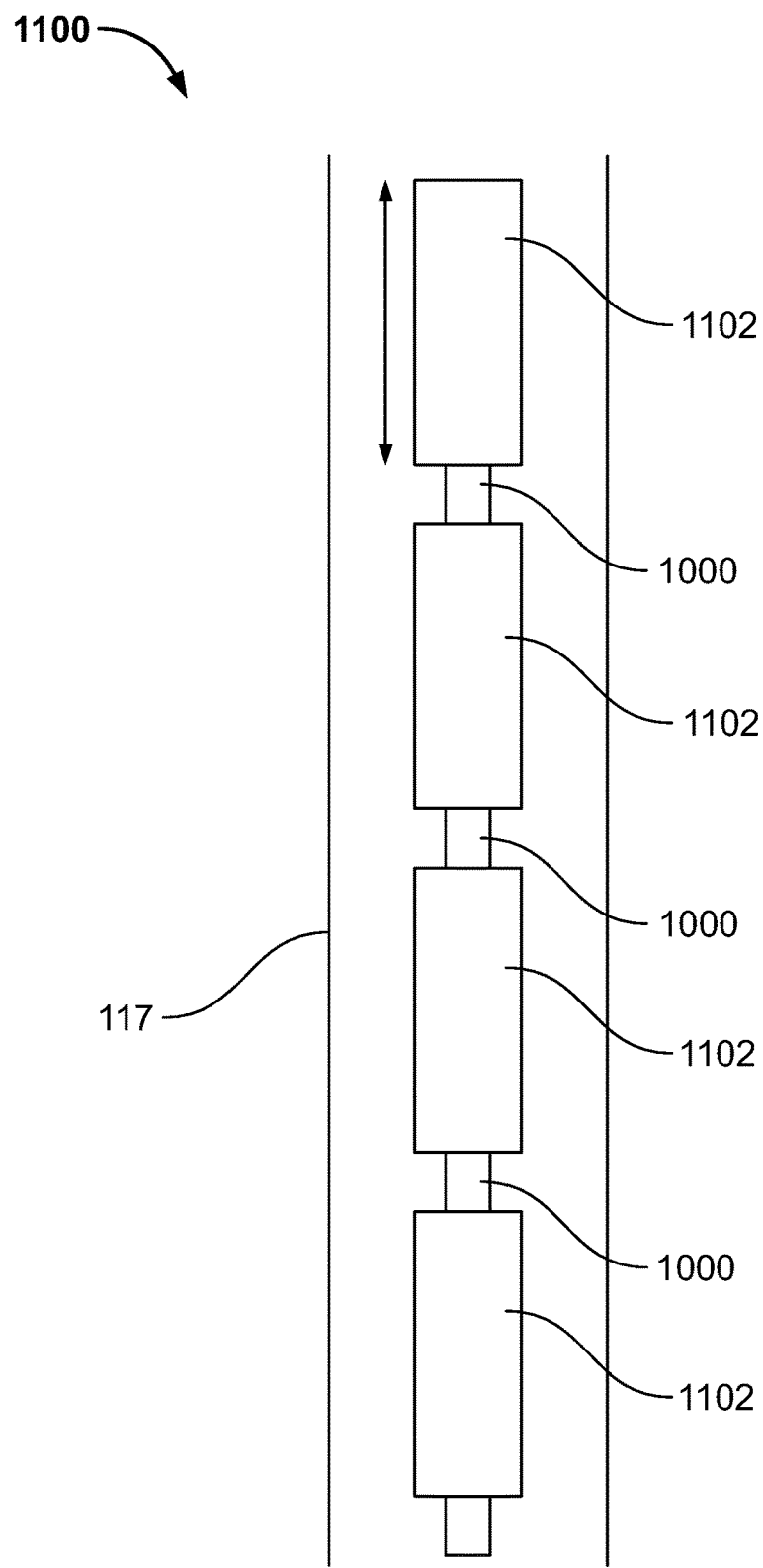
FIG. 11 is a cross sectional view of an illustrative embodiment of an auger coupling placed between pump sections.

As shown in FIG. 11, in a particular embodiment, twenty-one-foot sections of modular pumps are joined together to form 20-foot sections of pumps 1102 in a pipe line 117. In another particular embodiment, twenty-one-foot sections of modular pumps are joined together to form 20-foot sections of pumps 1102 in a drill pipe 116. The 20-foot sections of pumps 1102 are joined by the auger coupling in auger coupling housing 929. The auger coupling 1000 induces fluid flow in the pipeline 1104. In a particular embodiment, the auger coupling 1000 continues boundary layer flow between 20-foot sections of pumps 1102 in a drill pipe and in a pipeline.

Figure 12A:
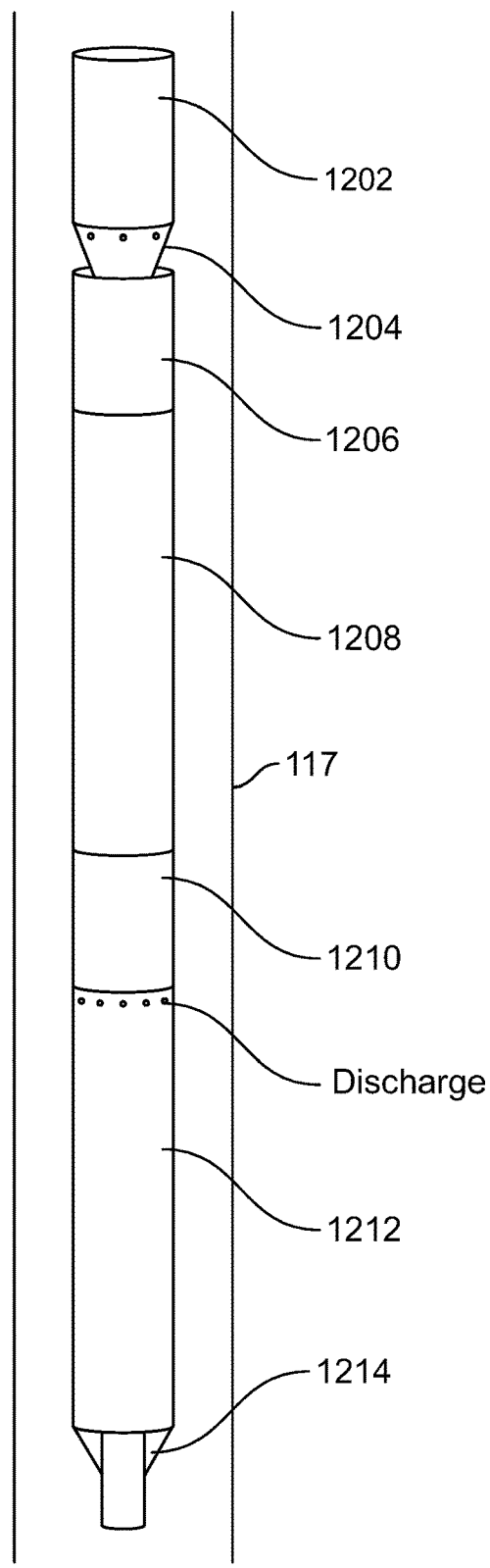
FIGS. 12A, 12B, 13 and 14 are cross section views of illustrative embodiment of an auger coupling placed between pump sections using a turbomachine to generate horsepower.
Figure 12B:
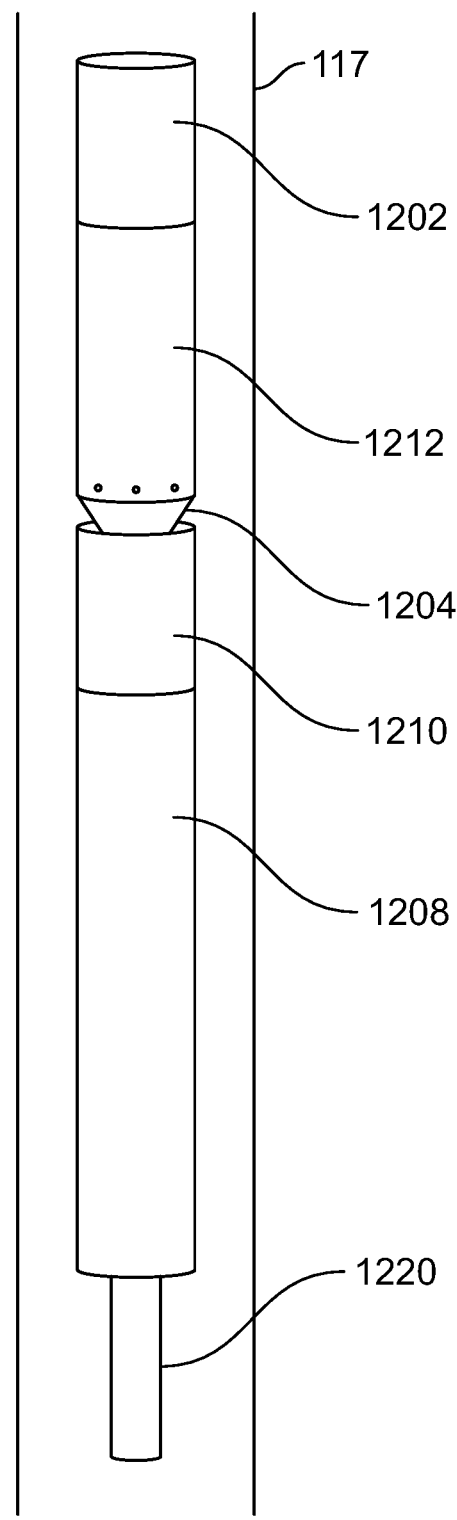

Turning now to FIG. 12A, in a particular illustrative embodiment, the turbomachines are used as a turbine motor and as a pump in pipeline 117. In a particular illustrative embodiment, the turbomachines are used as a turbine motor and as a pump in drill pipe 116. The shaft 1201 spins the turbomachine motor 1212 so that the turbomachine motor 1212 generates horse power to help turn the shaft 1201. In a particular embodiment, the turbomachine motor generated horsepower is applied to the shaft that is being driven by the motor 1208 that applies the horsepower to turn the shaft 1201. The horse power generated by the turbine reduces the motor horse power requirements to turn the shaft. As shown in FIG. 12 pump 1202 (which is a turbomachine pump or other type of pump) pumps fluid provided through intake 1204. A seal-chamber section (also referred to herein as a shaft seal section) 1206 is provided below the pump 1202 and above motor 1208. American Petroleum Institute Recommended Practice (API RP) 11S7 gives a detailed description of the design and functioning of typical seal-chamber sections. An upside-down shaft seal section 1210 is provided below the motor 1208. A turbomachine motor 1212 is provided above pump intake 1214. The turbomachine pump 1212 is rotated by the shaft 1201 and which generates horsepower that is applied to rotate the shaft 1201 reduces the horsepower requirements on motor 1208. A fluid in the wellbore in which the turbomachine pump and motor are placed is passed through the turbomachine motor to the pumps 1202. In FIG. 12B pumps, which can be a combination of any type pump such as a reciprocation pump and a turbomachine pumps 1202 are connected to the turbomachine motor 1212 in a pipeline 117. A seal section is below the pump and above the motor. A sensor 1220 is located below the motor. In another the combination of any type pump such as a reciprocation pump and a turbomachine pumps 1202 are connected to the turbomachine motor 1212 in a drill pipe 116.

Figure 13:
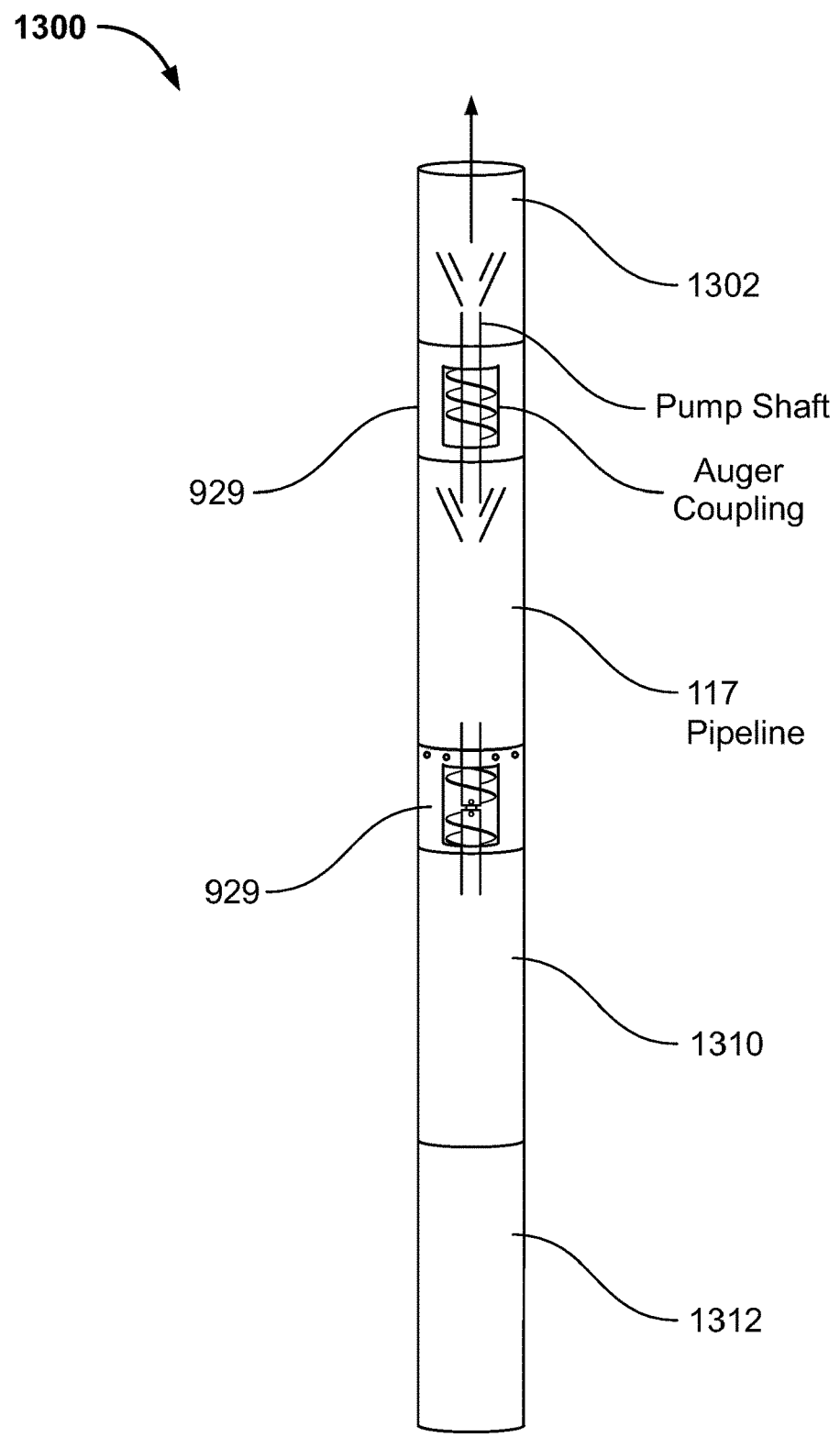

As shown in FIG. 13, in an illustrative embodiment is depicted 1300. A pump 1302 is connected to another pump 1306 using an auger coupling in auger coupling housing 929 deployed in a pipeline 117 as shown in FIG. 10. In another embodiment pump 1302 is connected to another pump 1306 using an auger coupling in auger coupling housing 929 deployed in a drill pipe 116. A second auger coupling 1308 having intake 1309. A seal section 1310 is provided above motor 1312.

Figure 14:
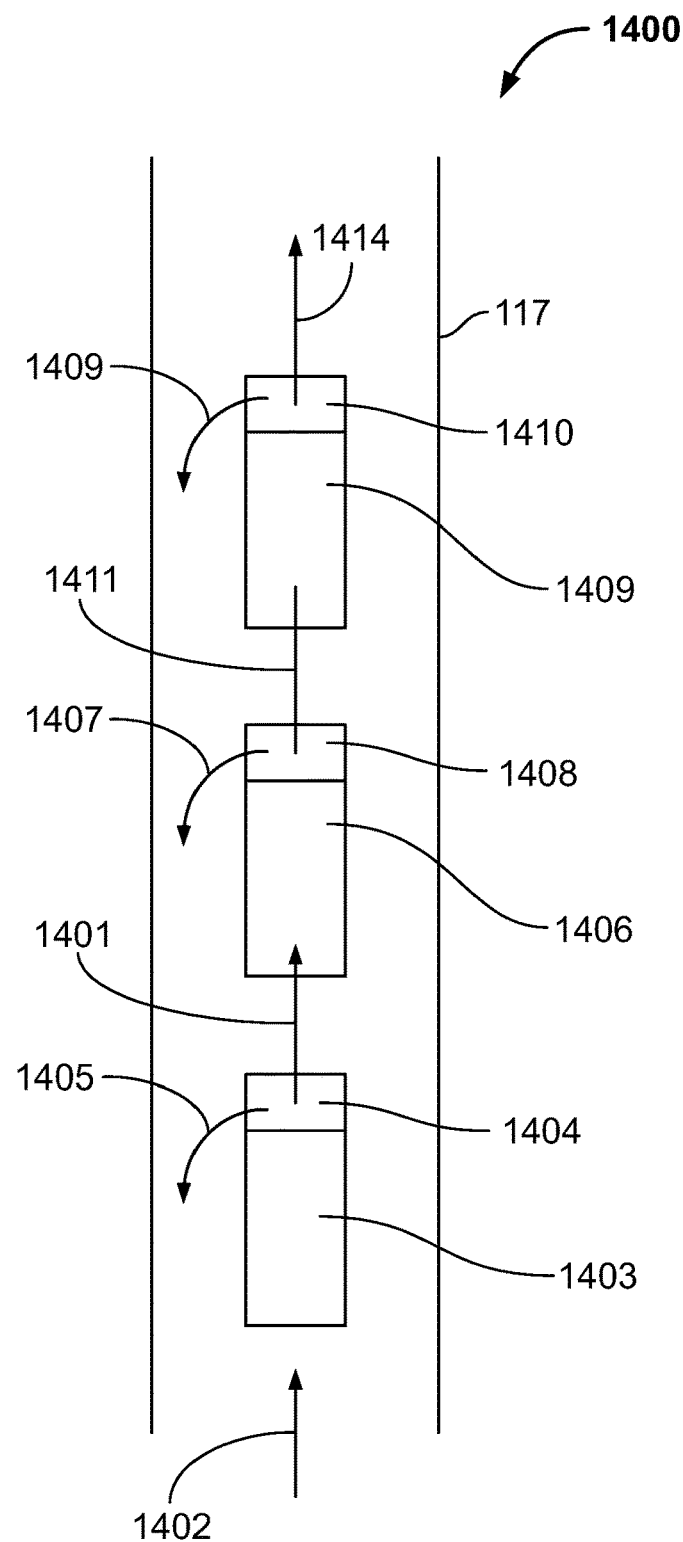

Turning now to FIG. 14, a cross section drawing 1400 of an illustrative embodiment of a progressive staged filter deployed in a pipe line 117 is depicted. In another illustrative embodiment of the progressive staged filter deployed in a drill pipe 116 is depicted. The axial distance d 710 between the conical and disk elements is adjusted to be smaller than a distance d between the conical and disk elements when a heavier fluid is passing through the rotary machine. Dense fluids 1402 having first density D1 enter a first turbomachine pump stage 1403 where the dense fluid is pumped and filter. Turbomachine filter stage 1 has a distance d1 between conical elements. The denser portions of the fluid 1402 are discharged by pump stage 1 as discharge fluid 1405. The filtered fluid 1401 from pump stage 1 is fed to pump stage 2 1406. The axial distance d 710 between the conical and disk elements is adjusted to be smaller than a distance d between the conical and disk elements when a heavier fluid is passing through the rotary machine. The axial distance d1 for pump stage 1 is set to pump the dense fluid 1402 having a density D1. Turbomachine filter stage 2 has a distance d2 between conical elements. The denser portions of the fluid 1401 are discharged by pump stage 2 as discharge fluid 1407. The filtered fluid 1408 from pump stage 2 is fed to pump stage 2 1409. Turbomachine filter stage 3 has a distance d3 between conical elements. The denser portions of the fluid 1407 are discharged by pump stage 3 as discharge fluid 1409. The filtered fluid 1414 from pump stage 3 is fed upward. Fluid density D3 is less than fluid density D2. Fluid density D2 is less than fluid density D1. The distance d1 between conical elements in pump stage 1 for larger than the distance d2 between conical elements in pump stage 2. The distance d2 between conical elements in pump stage 2 for larger than the distance d3 between conical elements in pump stage 3. In the progressive filter, the fluid density of pumping stage 1 is D1 and is denser than fluid density D2 of the fluid being pumped by pumping stage 2. The fluid density of pumping stage 2 is D2 and is denser than fluid density D3 being pumped by pumping stage 3.

The present invention can be realized in hardware, software, or a combination of hardware and software. In a specific embodiment, a system according to the present inventions can be realized in a centralized fashion in one computer system, or in a distributed fashion where different elements are spread across several interconnected computer systems. Any kind of computer system or other apparatus adapted for carrying out the methods and inventions described herein may be used for purposes of the present inventions. A typical combination of hardware and software could be a general-purpose computer system with a computer program that, when being loaded and executed, controls the computer system such that it carries out the methods and inventions described herein.

The figures herein include block diagram and flowchart illustrations of methods, apparatus(s) and computer program products according to various embodiments of the present inventions. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus may be used to implement the functions specified in the block, blocks or flow charts. These computer program instructions may also be stored in a computer-readable medium or memory that can direct a computer or other programmable data processing apparatus to function in a particular manner, such that the instructions stored in the computer-readable medium or memory produce an article of manufacture including instructions which may implement the function specified in the block, blocks or flow charts. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block, blocks or flow charts.

Those skilled in the art should readily appreciate that programs defining the functions of the present inventions can be delivered to a computer in many forms, including but not limited to: (a) information permanently stored on non-writable storage media (e.g., read only memory devices within a computer such as ROM or CD-ROM disks readable by a computer I/O attachment); (b) information alterably stored on writable storage media (e.g., floppy disks and hard drives); or (c) information conveyed to a computer through communication media for example using wireless, baseband signaling or broadband signaling techniques, including carrier wave signaling techniques, such as over computer or telephone networks via a modem, or via any of networks.

The term "executable" as used herein means that a program file is of the type that may be run by the Turbomachine processor 110. In specific embodiments, examples of executable programs may include without limitation: a compiled program that can be translated into machine code in a format that can be loaded into a random access portion of the Computer Readable Medium 128 and run by the Turbomachine processor 110; source code that may be expressed in proper format such as object code that is capable of being loaded into a random access portion of the Computer Readable Medium 128 and executed by the Turbomachine processor 110; or source code that may be interpreted by another executable program to generate instructions in a random access portion of the Computer Readable Medium to be executed by the Turbomachine processor 110. An executable program may be stored in any portion or component of the Computer Readable Medium including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The Computer Readable Medium may include both volatile and nonvolatile memory and data storage components. Volatile components are those that do not retain data values upon loss of power. Nonvolatile components are those that retain data upon a loss of power. Thus, the Computer Readable Medium may comprise, for example, random access memory (RAM), read-only memory (ROM), hard disk drives, solid-state drives. USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In a specific embodiment, the Turbomachine processor may represent multiple Turbomachine processors and/or multiple processor cores and the Computer Readable Medium may represent multiple Computer Readable Mediums that operate in parallel processing circuits. respectively. In such a case, the local interface may be an appropriate network that facilitates communication between any two of the multiple Processors, between any processor and any of the Computer Readable Medium, or between any two of the Computer Readable Mediums, etc. The local interface may comprise additional systems designed to coordinate this communication, including, for example, performing load balancing. The Turbomachine processor may be of electrical or of some other available construction.

In a particular illustrative embodiment, A rotary machine operable for transformation of energy between rotary mechanical energy and fluid kinetic energy is disclose, the rotary including but not limited to a drive shaft; a tubular housing defining a fluid input and a fluid output and a rotor operating region; a rotor mounted within the rotor operating region for rotation about a rotor axis of rotation through the drive shaft, the rotor comprising a first rotor end and a second rotor end, the axis of rotation extending between the first rotor end and the second rotor end, the rotor operating region being positioned between the fluid input and the fluid output; and a plurality of rotor elements for the rotor, the plurality of rotor elements being axially spaced from each other along the rotor, the plurality of rotor elements comprising a plurality of surfaces oriented on the rotor so as to be concentric to the rotor axis of rotation, the plurality of rotor elements axially spaced a distance RD between the rotor elements, defining therebetween a plurality of radial flow paths each having a path width PW defined by the distance RD between the rotor elements, the plurality of rotor elements defining a plurality of centrally positioned apertures that collectively define an unrestricted interior opening that surrounds the drive shaft and connects to the plurality of radial flow paths to permit radially outwardly fluid flow through the plurality of radial flow paths, the unrestricted interior opening receiving fluid flow from the fluid input to provide the radially outwardly fluid flow through the plurality of radial flow paths; and a solids port through which the solids are removed from the fluid. In another particular embodiment of the invention, the solids port through which the solids are transferred from the tubular housing, the rotary machine further including but not limited to a fluid port though which the fluid is transferred from the tubular housing, wherein the solids port and the fluid port are two separate ports, the rotary machine is a centrifugal fluid separator that separates a gas from the fluid, the rotary machine further including but not limited to a gas port though which the gas is transferred from the tubular housing. In another particular embodiment of the invention, the rotary machine further includes but is not limited to a motor attached to the drive shaft. In another particular embodiment of the invention, the rotary machine includes but is not limited to a plurality of stacked rotary machines used as an inline pump in pipelines to boost fluid flow. In another particular embodiment of the invention, the rotary machine comprises a plurality of stacked rotary machines used to compress the fluid when the fluid is a gas. In another particular embodiment of the invention, the rotary machine is used as a jet engine. In another particular embodiment of the invention, the rotary machine is used to propel a ship. In another particular embodiment of the invention, the plurality of stacked rotary machines is used to pump provide more head than a single rotary machine and have a smaller diameter housing than a single rotary machine housing diameter.

In another particular embodiment of the invention, the rotary machine is used as an injection pump to provide high pressure pumping from surface to deep downhole being able to handle pressure changes, cavitation and solids. In another particular embodiment of the invention, the rotary machine is used to dewater mines, wherein the rotary machine carries heavy abrasives without substantial impingement wear. In another particular embodiment of the invention, the tubular housing has a housing diameter HD, wherein the housing diameter is selected based on the density of the fluid FD, wherein the selected housing diameter HD is proportional to the density of the fluid FD. In another particular embodiment of the invention, the rotary machine further including but not limited to a motor attached to the drive shaft; a processor in data communication with a computer readable medium and the motor; and a computer program stored in the computer readable medium, the computer program comprising instructions executed by the processor, the computer program further comprising instructions to adjust a speed value for the motor wherein the speed value is adjusted inversely proportional to a density FD of the fluid. In another particular embodiment of the invention, the motor is an electric motor and density FD of the fluid is estimated by current flowing to the electric motor. In another particular embodiment of the invention, the drive shaft further comprises a variable distance element. In another particular embodiment of the invention, the computer program further including but not limited to instructions to adjust the variable distance element from a first distance value RD1 for the space between the rotor elements to a distance value RD2 for the space between the rotor elements based on a density FD of the fluid. In another particular embodiment of the invention, the rotary machine further comprises a multi-staged rotary machine that has a smaller housing diameter HD than a single stage rotary machine. In another particular embodiment of the invention, the plurality of radial flow paths are oriented parallel or substantially parallel with respect to each other and are angled between zero and ninety degrees with respect to the rotor axis of rotation. In another particular embodiment of the invention, the fluid input is on an opposite end of the tubular housing from the fluid output. In another particular embodiment of the invention, the tubular housing further defines a peripheral fluid flow path along a periphery of the rotor, the peripheral fluid flow path being in communication with the fluid input and the fluid output, the tubular housing constraining fluid to move with an axial direction vector component through the fluid input into the tubular housing, through the peripheral flow path, out of the tubular housing through the fluid output. In another particular embodiment of the invention, the peripheral flow path is substantially concentric with the rotor. In another particular embodiment of the invention, at least a portion the plurality of rotor elements are substantially identical. In another particular embodiment of the invention, further includes but is not limited to a plurality of tubular housing sections each defining a fluid input and a fluid output and a rotor operating region, the plurality of tubular housing sections being axially oriented with respect to each other such that a respective output of each tubular section is connected to a respective input of another tubular section; and a respective rotor for each of the plurality of tubular housing sections mounted within the rotor operating region for rotation about a rotor axis of rotation, and a respective plurality of spaced rotor elements for each respective rotor, and each respective plurality of spaced rotor elements defining a plurality of radial flow paths therebetween.

In another particular embodiment of the invention, a turbomachine compressor is disclosed, the turbomachine compressor including but not limited to a tubular housing defining a fluid input and a fluid output and a rotor operating region; a rotor mounted within the rotor operating region for rotation about a rotor axis of rotation through the drive shaft, the rotor comprising a first rotor end and a second rotor end, the axis of rotation extending between the first rotor end and the second rotor end, the rotor operating region being positioned between the fluid input and the fluid output; and a plurality of rotor elements for the rotor, the plurality of rotor elements being axially spaced from each other along the rotor, the plurality of rotor elements comprising a plurality of surfaces oriented on the rotor so as to be concentric to the rotor axis of rotation, the plurality of rotor elements axially spaced a distance RD between the rotor elements, defining therebetween a plurality of radial flow paths each having a path width PW defined by the distance RD between the rotor elements, the plurality of rotor elements defining a plurality of centrally positioned apertures that collectively define an unrestricted interior opening that surrounds the drive shaft and connects to the plurality of radial flow paths to permit radially outwardly fluid flow through the plurality of radial flow paths, the unrestricted interior opening receiving fluid flow from the fluid input to provide the radially outwardly fluid flow through the plurality of radial flow paths. In another particular embodiment of the invention, the turbomachine further includes but is not limited to a motor attached to the drive shaft; a processor in data communication with a computer readable medium and the motor; and a computer program stored in the computer readable medium, the computer program comprising instructions executed by the processor, the computer program further comprising instructions to adjust a speed value for the motor wherein the speed value is adjusted inversely proportional to a density FD of the fluid. In another particular embodiment of the invention, the motor is an electric motor and density FD of the fluid is estimated by current flowing to the electric motor. In another particular embodiment of the invention, the drive shaft further comprises a variable distance element, the computer program further comprising: instructions to adjust the variable distance element from a first distance value RD1 for the space between the rotor elements to a distance value RD2 for the space between the rotor elements based on a density FD of the fluid. In another particular embodiment of the invention, the computer program further comprising instructions to adjust the variable distance element from a first distance value RD1 for the space between the rotor elements to a distance value RD2 for the space between the rotor elements based on a density FD of the fluid.

In another particular embodiment of the invention, a turbomachine motor for transformation of energy from fluid kinetic energy to rotary mechanical energy, the turbomachine motor including but not limited to a drive shaft; a tubular housing defining a fluid input and a fluid output and a rotor operating region; a rotor mounted within the rotor operating region for rotation about a rotor axis of rotation through the drive shaft, the rotor comprising a first rotor end and a second rotor end, the axis of rotation extending between the first rotor end and the second rotor end, the rotor operating region being positioned between the fluid input and the fluid output; and a plurality of rotor elements for the rotor, the plurality of rotor elements being axially spaced from each other along the rotor, the plurality of rotor elements comprising a plurality of surfaces oriented on the rotor so as to be concentric to the rotor axis of rotation, the plurality of rotor elements axially spaced a distance RD between the rotor elements, defining therebetween a plurality of radial flow paths each having a path width PW defined by the distance RD between the rotor elements, the plurality of rotor elements defining a plurality of centrally positioned apertures that collectively define an unrestricted interior opening that surrounds the drive shaft and connects to the plurality of radial flow paths; and a fluid supply, wherein a fluid is pumped from the fluid supply to the fluid input to produce rotational motion of the rotor so that the turbomachine motor acts as a hydraulic motor. In another particular embodiment of the invention, the rotary machine drives a downhole equipment in a slim hole environment. In another particular embodiment of the invention, the rotary machine drives a compressor in a downhole environment that includes but is not limited to a motor attached to the drive shaft; a processor in data communication with a computer readable medium and the motor; and a computer program stored in the computer readable medium, the computer program comprising instructions executed by the processor, the computer program further comprising instructions to adjust a speed value for the motor wherein the speed value is adjusted inversely proportional to a density FD of the fluid. In another particular embodiment of the invention, the motor is an electric motor and density FD of the fluid is estimated by current flowing to the electric motor. In another particular embodiment of the invention, the drive shaft further comprises a variable distance element, the computer program further includes but is not limited to instructions to adjust the variable distance element from a first distance value RD1 for the space between the rotor elements to a distance value RD2 for the space between the rotor elements based on a density FD of the fluid. In another particular embodiment of the invention, the drive shaft further comprises a variable distance element, the computer program further comprising instructions to adjust the variable distance element from a first distance value RD1 for the space between the rotor elements to a distance value RD2 for the space between the rotor elements based on a density FD of the fluid.

Although the programs and other various systems, components and functionalities described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

Flowcharts and Block Diagrams of FIG. 1 show the functionality and operation of various specific embodiments of certain aspects of the present inventions. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a Turbomachine processor in a computer system or other system. The machine code may be converted from the source code, etc. If embodied in hardware, each block may represent a circuit or a number of interconnected circuits to implement the specified logical function(s).

Although the flowchart and block diagram of FIG. 1 show a specific order of execution, it is understood that the order of execution may differ from that which is depicted. For example, the order of execution of two or more blocks may be scrambled relative to the order shown. Also, two or more blocks shown in succession in FIG. 1 may be executed concurrently or with partial concurrence. Further, in some embodiments, one or more of the blocks shown in FIG. 1 may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present inventions.

Any logic or application described herein that comprises software or code can be embodied in any non-transitory computer-readable medium, such as computer-readable medium, for use by or in connection with an instruction execution system such as, for example, a Turbomachine processor in a computer system or other system. In this sense, the logic may comprise, for example, statements including instructions and declarations that can be fetched from the computer-readable medium and executed by the instruction execution system. In the context of the present inventions, a "computer-readable medium" may include any medium that may contain, store, or maintain the logic or application described herein for use by or in connection with the instruction execution system.

The computer-readable medium may comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The Turbomachine processor may further include a network interface coupled to the bus and in communication with the network. The network interface may be configured to allow data to be exchanged between computer and other devices attached to the network or any other network or between nodes of any computer system or the video system. In addition to the above description of the network, it may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 159 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The Turbomachine processor may also include an input/output interface coupled to the bus and also coupled to one or more input/output devices, such as a display, a touchscreen, a mouse or other cursor control device, and/or a keyboard. In certain specific embodiments, further examples of input/output devices may include one or more display terminals, keypads, touchpads, scanning devices, voice or optical recognition devices, or any other devices suitable for entering or accessing data by one or more computers. Multiple input/output devices may be present with respect to a computer or may be distributed on various nodes of computer system, the system and/or any of the viewing or other devices shown in FIG. 1. In some embodiments, similar input/output devices may be separate from the Turbomachine processor and may interact with the Turbomachine processor or one or more nodes of computer system through a wired or wireless connection, such as through the network interface.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. An apparatus comprising:
a first rotary machine operable for transformation of energy between rotary mechanical energy and fluid kinetic energy, the rotary machine comprising:
a drive shaft;
a tubular housing defining a fluid input and a fluid output and a rotor operating region;
a rotor mounted within the rotor operating region for rotation about a rotor axis of rotation through the drive shaft, the rotor comprising a first rotor end and a second rotor end, the axis of rotation extending between the first rotor end and the second rotor end, the rotor operating region being positioned between the fluid input and the fluid output; and a plurality of rotor elements for the rotor, the plurality of rotor elements being axially spaced from each other along the rotor, the plurality of rotor elements comprising a plurality of surfaces oriented on the rotor so as to be concentric to the rotor axis of rotation, the plurality of rotor elements axially spaced a distance RD between the rotor elements, defining therebetween a plurality of radial flow paths each having a path width PW defined by the distance RD between the rotor elements, the plurality of rotor elements defining a plurality of centrally positioned apertures that collectively define an unrestricted interior opening that surrounds the drive shaft and connects to the plurality of radial flow paths to permit radially outwardly fluid flow through the plurality of radial flow paths, the unrestricted interior opening receiving fluid flow from the fluid input to provide the radially outwardly fluid flow through the plurality of radial flow paths;
a solids port through which the solids are removed from the fluid;
a motor attached to the drive shaft;
a processor in data communication with a computer readable medium and the motor; and
a computer program stored in the computer readable medium, the computer program comprising instructions executed by the processor, the computer program further comprising instructions to adjust a speed value for the motor wherein the speed value is adjusted inversely proportional to a density FD of the fluid.

2. The apparatus of claim 1, wherein the motor is an electric motor and density FD of the fluid is estimated by current flowing to the electric motor.

* * * * *